(12) United States Patent
Byan

(10) Patent No.: US 8,386,838 B1
(45) Date of Patent: Feb. 26, 2013

(54) HIGH-AVAILABILITY OF A STORAGE SYSTEM IN A HIERARCHICAL VIRTUAL SERVER ENVIRONMENT

(75) Inventor: Stephen M. Byan, Littleton, MA (US)

(73) Assignee: NetApp, Inc., Sunnyvale, CA (US)

( * ) Notice: Subject to any disclaimer, the term of this patent is extended or adjusted under 35 U.S.C. 154(b) by 654 days.

(21) Appl. No.: 12/628,913

(22) Filed: Dec. 1, 2009

(51) Int. Cl.
*G06F 11/00* (2006.01)
(52) U.S. Cl. .................. 714/6.2; 714/5.11; 714/6.23
(58) Field of Classification Search .................. None
See application file for complete search history.

(56) References Cited

U.S. PATENT DOCUMENTS

| | | | |
|---|---|---|---|
| 7,213,065 B2 | 5/2007 | Watt | |
| 7,340,640 B1 * | 3/2008 | Karr et al. | 714/6.23 |
| 7,836,332 B2 * | 11/2010 | Hara et al. | 714/5.11 |
| 8,019,732 B2 * | 9/2011 | Paterson-Jones et al. | 707/674 |
| 8,051,246 B1 | 11/2011 | Caklovic | |
| 2005/0081092 A1 * | 4/2005 | Hsu et al. | 714/6 |
| 2008/0080526 A1 | 4/2008 | Gounares | |
| 2008/0155223 A1 | 6/2008 | Hiltgen | |
| 2008/0195756 A1 | 8/2008 | Galles | |
| 2010/0049851 A1 | 2/2010 | Garrison | |
| 2010/0223309 A1 | 9/2010 | Benari | |
| 2011/0004735 A1 | 1/2011 | Arroyo | |
| 2011/0023028 A1 | 1/2011 | Nandagopal | |

OTHER PUBLICATIONS

Ng, Spencer, "Some Design Issues of Disk Arrays", 1989, IEEE, pp. 137-142.*
U.S. Appl. No. 12/628,877, filed Dec. 1, 2009, Stephen M. Byan.
U.S. Appl. No. 12/628,877, filed Dec. 1, 2009, Byan, Office Action dated Mar. 12, 2012.

* cited by examiner

*Primary Examiner* — Michael Maskulinski
(74) *Attorney, Agent, or Firm* — Stattler-Suh PC

(57) ABSTRACT

Described herein is a high-availability storage system having hierarchical levels of storage functions. The storage system may comprise one or more hierarchical levels, each hierarchical level comprising physical servers and be assigned to perform a particular set of storage functions. Each physical server may implement one or more VMs configured to perform only the set of storage functions assigned to the hierarchical level on which the VM executes. VMs of a first hierarchical level may be configured to organize the VMs of a second hierarchical level into a redundant array of storage access servers for providing data reliability and high-availability of the storage system. VMs of a first hierarchical level are configured to produce and route sub-requests to the VMs of a second hierarchical level. Failure of a sub-request is detected and remedied by a VM of the first hierarchical level.

21 Claims, 11 Drawing Sheets

HIGH-AVAILABILITY OF A STORAGE SYSTEM IN A HIERARCHICAL VIRTUAL SERVER ENVIRONMENT

FIELD

The present invention relates to virtual server environments and more specifically, to storage systems in a hierarchical virtual server environment.

BACKGROUND

A virtual server environment may include a storage system (for storing client data on storage devices) and multiple clients accessing the storage system. The storage system may include multiple server pools, each server pool comprised of one or more physical servers. Each physical server may comprise hardware components for executing software applications within the storage system. The physical servers may access the storage devices for providing storage services to the clients.

In a virtual server environment, a physical server may include multiple virtual machines (VMs) that reside and execute on the physical server. Each VM (sometimes referred to as a virtual server or virtual desktop) may comprise a separate encapsulation or instance of a separate operating system and one or more applications that execute on the physical server. As such, each VM on a physical server may have its own operating system and set of applications, and function as a self-contained package on the physical server, whereby multiple operating systems may execute simultaneously on the same physical server. VMs can be rapidly and seamlessly shifted from one physical server to any other server, and optimally utilize the resources without affecting the applications.

Each VM on a physical server may be configured to share the hardware resources of the server. Hardware resources typically include power supplies and power management hardware, volatile memory, non-volatile memory, network interface facilities, processors and co-processors, environmental and enclosure management facilities, physical storage devices (e.g., hard drives, flash drives, external storage devices, etc) and RAID hardware. Each physical server may include a VM monitor module/engine (sometimes referred to as a hypervisor module/engine) that executes on the server to produce and manage the VMs. The VM monitor module/engine (hypervisor) may also virtualize the hardware and/or software resources of the servers for use by the VMs. The operating system of each VM may utilize and communicate with the resources of the physical server via the hypervisor.

The virtual server environment may also include a plurality of clients connected with each physical server for accessing the client data stored on the storage system. The client data may be stored on a set of storage devices of the storage system. Each client may connect and interface/interact with a particular VM of a physical server to access the client data of the storage system. From the viewpoint of a client, the VM may comprise a virtual server that appears and behaves as an actual physical server or desktop for accessing the storage devices. For example, a single physical server may be "virtualized" into 1, 2, 4, 8, or more virtual servers or virtual desktops, each executing their own operating system and one or more applications. A storage system may be configured to allow clients to access its data, for example, to read or write data to the storage system. A client may execute a client application that requests to "connect" to the storage system over a network. The client application may send an access request (e.g., a read request or write request) to the storage system for accessing particular data stored on the storage devices of the storage system.

A storage system may include multiple VMs. Each VM may be assigned to execute an operating system and one or more applications. For example, a VM may be assigned to execute a storage operating system and typically performs all the storage functions provided by the storage operating system. There are several advantages in implementing storage operating systems within VMs on a physical server. VMs executing the storage operating system may be rapidly cloned and deployed and easily transferred between physical servers in the virtual server environment as needed.

However, a VM executing a storage operating system may be susceptible to failure and only be as reliable as the storage operating system it executes. Also, since the VM typically performs all the storage functions provided by the storage operating system, if one of the storage functions fails, this may cause failure of all the other storage functions currently performed by the VM. Also, a VM executing a storage operating system may introduce a single point of failure in the storage system. As such, there is a need for an improved method of implementing VMs in a virtual server environment.

SUMMARY

Described herein are systems and methods for high-availability of a storage system in a hierarchical virtual server environment. In some embodiments, a storage system comprises a plurality of physical servers including one or more storage transaction servers and a plurality of storage access servers. Each storage transaction server may interact with client systems submitting access (read/write) requests for client data stored on storage devices. Each storage access server may comprise a plurality of storage devices for storing client data. In some embodiments, a plurality of storage access servers may be organized into a redundant array of storage access servers (RASAS) for providing data reliability and high-availability of the storage system. In these embodiments, for each received access request, a storage transaction server produces and routes at least two sub-requests ("storage access sub-requests") for execution by at least two storage access servers organized in a RASAS configuration.

The RASAS may be organized based on a selected redundancy configuration, such as a mirroring configuration (whereby client data in a first storage access server is mirrored in a second storage access server), a striping configuration (whereby client data is striped across a first storage access server and a second storage access server), etc. In other embodiments, the RASAS may be organized based on other redundancy configurations such as storing three or more copies of the client data, storing client data with an erasure code such as parity or double parity, etc. In these embodiments, for each received access request, the storage transaction server may produce at least two storage access sub-requests based on the RASAS configuration type used (whereby the storage access sub-requests are produced specifically for the RASAS configuration type).

For example, if the RASAS is organized in a mirroring configuration, a storage transaction server may receive a write request (comprising client data to be stored) and produce first and second storage access sub-requests, each storage access sub-request specifying that all of the client data be stored. The first storage access sub-request may be received and executed by a first storage access server (which stores the received client data on its storage devices) and the second storage access sub-request may be received and executed by a second storage access server (which stores the received client data on its storage devices). As such, the client data is mirrored across the first and second storage access servers for providing data reliability and high-availability of the storage system.

In another example, if the RASAS is organized in a striping configuration, a storage transaction server may receive a write request (comprising client data to be stored) and produce a first storage access sub-request specifying that a first sub-set of the client data be stored (e.g., the odd numbered data blocks of the client data) and a second storage access sub-request specifying that a second sub-set of the client data be stored (e.g., the even numbered data blocks of the client data). The first storage access sub-request may be received and executed by a first storage access server (which stores the first sub-set of client data on its storage devices) and the second storage access sub-request may be received and executed by a second storage access server (which stores the second sub-set of client data on its storage devices). As such, the client data may be written across the first and second storage access servers for providing data reliability and high-availability of the storage system, or the client data may be written across the first and second storage access servers for providing improved performance of the storage system.

In some embodiments, a storage access server further contains a storage access server memory for storing software application instructions and a storage access server processor for executing the software applications instructions. The software application instructions executed by the processor may include instructions for receiving storage access sub-requests from a storage transaction server and executing the storage access sub-requests on its set of storage devices. In some embodiments, each storage access server may implement one or more storage access VMs, each storage access VM executing a storage operating system that provides an overall set of storage functions but is configured to perform only storage access functions of the overall storage functions provided by the storage operating system. In these embodiments, a storage access VM is configured for receiving storage access sub-requests from the storage transaction server and executing the storage access sub-requests on its set of storage devices.

In further embodiments, the at least two storage access sub-requests received at the at least two storage access servers may implement a RASAS including storing client data using an erasure code. In some embodiments, an erasure code with a particular degree of redundancy is selected, and the organization of the RASAS may be formed so as to facilitate rebuilding of client data in the event of a detected failure of a component of the hierarchical virtual server environment. Selecting an erasure code with a particular degree of redundancy may involve trade-offs between the extent of a defined failure domain for which a recovery scheme is implemented, versus the cost and complexity of managing the data integrity within the failure domain, versus the predicted frequency of a failure, and versus the cost and complexity of implementing a recovery.

A storage transaction server may monitor received storage requests and monitor the operational health of the storage access servers, and may establish checkpoints to be used in restoring system state in the event of certain types of failures of one or more storage access servers. A storage transaction server monitor identifies characteristics of the failure and invokes a rebuild operation for restoring the integrity of any client data affected by the failure.

Defining a failure domain to include relatively more components (e.g. including an entire physical server) as compared to defining a failure domain to include relatively fewer components (e.g. just a hard disk drive) increases the likelihood that a failure will occur within a given time period. However, while replacement of a failed hard drive might require human intervention (e.g. to physically remove the failed drive and replace it with a replacement drive), the replacement of an entire storage access server might be accomplished fully automatically under control of a storage transaction server by assigning a new storage access server from a pool of physical servers, and deploying a new instance of a storage access server OS within a VM on the newly assigned storage access server.

BRIEF DESCRIPTION OF THE DRAWINGS

The novel features are set forth in the appended claims. However, for purpose of explanation, several embodiments of the invention are set forth in the following figures.

DETAILED DESCRIPTION

In the following description, numerous details are set forth for purpose of explanation. However, one of ordinary skill in the art will realize that the embodiments described herein may be practiced without the use of these specific details. In other instances, well-known structures and devices are shown in block diagram form in order to not obscure the description with unnecessary detail.

The description that follows is divided into three sections: Section I describes a hierarchical virtual server environment, Section II describes high-availability storage systems in a hierarchical virtual server environment, and Section III describes methods for producing a storage system having hierarchical levels and methods for providing high-availability storage systems in a hierarchical virtual server environment.

I. Hierarchical Virtual Server Environment

A. Overview

Figure 1A:
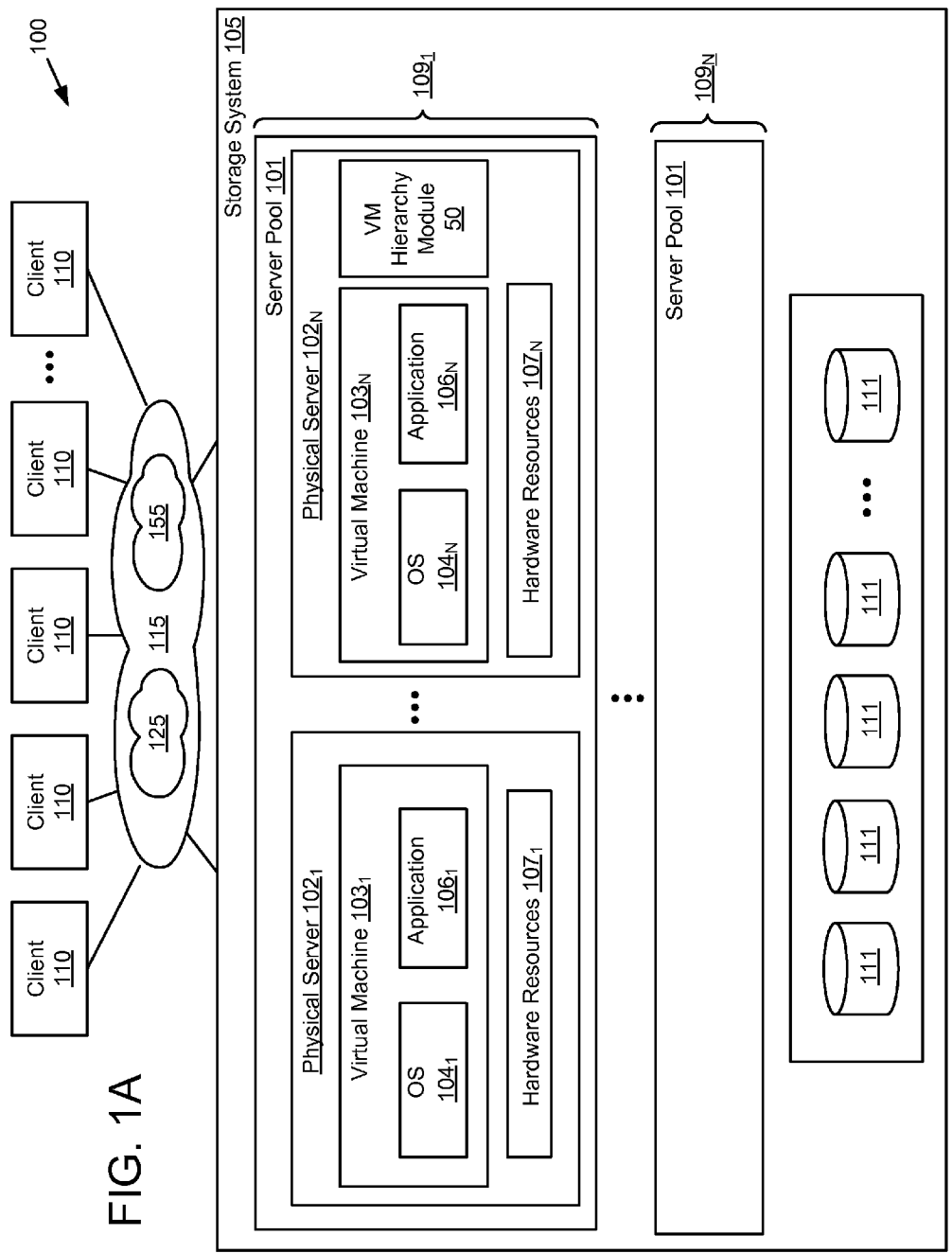
FIG. 1A is a block diagram of an exemplary hierarchical virtual server environment in which some embodiments operate.

FIG. 1A is a block diagram of an exemplary hierarchical virtual server environment 100 in which some embodiments operate. The hierarchical virtual server environment 100 may include a storage system 105 and one or more client systems 110 accessing the storage system 105 through a network 115. The storage system 105 may comprise a set of one or more storage devices 111 for storing client data.

The network 115 may comprise, for example, one or more packet-oriented sub-networks 125 and/or one or more block-oriented sub-networks 155. A packet-oriented network may comprise a local area network (LAN), an Ethernet subnet, a PCI or PCIe subnet, a switched PCIe subnet, a wide area network (WAN), a metropolitan area network (MAN), the Internet, or the like. A block-oriented sub-network may comprise a Fibre Channel Protocol (FCP) sub-network, or the like.

The storage system may also include one or more server pools 101, each server pool 101 comprised of one or more physical servers 102 that access the client data stored in the storage devices 111 for providing storage services to the clients. Each physical server may comprise hardware resources/components 107 for providing such storage services. Each physical server 102 may include one or more virtual machines 103 (VMs) that reside and execute on the physical server. Each VM 103 (sometimes referred to as a virtual server or virtual desktop) may comprise a separate encapsulation or instance of a separate storage operating system 104 and one or more storage applications 106 that execute on the physical server to access the storage devices 111.

To execute the storage operating system and/or storage applications 106, each VM 103 on a physical server may be configured to share the hardware resources 107 of the server. Hardware resources 107 typically include power supplies and power management hardware, volatile memory, non-volatile memory, network interface facilities, processors and co-processors, environmental and enclosure management facilities, physical storage devices (e.g., hard drives, flash drives, external storage devices, etc.), RAID hardware, and the like. Hardware resources may also include environmental and enclosure management facilities embodied as an intelligent platform management interface (IPMI) module associated with a particular physical server.

The virtual server environment may also include a plurality of clients 110 connected with each physical server 102 for accessing client data stored on the storage system. Each client may connect and interface/interact with a particular VM 103 of a physical server to access client data of the storage system. From the viewpoint of a client 110, the VM 103 may comprise a virtual server that appears and behaves as an actual physical server or desktop for providing access services to the storage devices 111. For example, a single physical server may be "virtualized" into 1, 2, 4, 8, or more virtual servers or virtual desktops, each executing their own storage operating system and one or more storage applications for providing storage services.

As described above, a VM 103 may be assigned to execute a storage operating system (e.g., Data ONTAP® available from NetApp, Inc. of Sunnyvale, Calif.) which may provide an overall set of storage functions (e.g., to manage access to storage objects, implement a file system, manage concurrent access to storage devices, manage transactional accesses to storage devices, implement high-availability facilities including mirroring, striping, striping/mirroring, caching, error detection, error correction, failure recovery, etc). In some embodiments, the overall set of storage functions provided by a storage operating system 104 comprises a set of storage transaction functions and a set of storage access functions. The set of storage transaction functions and the set of storage access functions each comprise a set of storage functions that is fewer than the overall set of storage functions provided by a storage operating system.

In some embodiments, a VM hierarchy module 50 resides and executes on at least one of the physical servers 102. The VM hierarchy module 50 may produce a storage system 105 configured to have hierarchical levels 109 of physical servers 102 and VMs 103 based on storage functions. The VM hierarchy module 50 may do so by sending commands/requests to the various components (e.g., hypervisor, operating system, etc.) of a plurality of physical servers 102 for dividing the plurality of physical servers 102 and VMs 103 into two or more hierarchical levels 109 as described below. In other embodiments, however, a physical server may host VMs providing storage functions from different hierarchical levels. In these embodiments, the VMs may be assigned to hierarchical levels based on storage functions, whereas the physical servers may or may not be assigned to hierarchical levels (and may operate in multiple hierarchical levels).

In some embodiments, the VM hierarchy module 50 may divide the physical servers of the storage system into at least two hierarchical levels 109. Each hierarchical level 109 may comprise one or more server pools 101, each server pool comprising one or more physical servers 102, each server implementing one or more VMs 103. Each physical server 102 may be capable of communicating (e.g., through an inter-server backplane or inter-server network) to other physical servers within the same hierarchical level or between different hierarchical levels.

The VM hierarchy module 50 may assign each physical server 102 and each VM 103 to a particular hierarchical level. In some embodiments, each hierarchical level 109 of a storage system 105 is assigned to provide a particular set of storage functions. A set of storage functions may sometimes be referred to as a mode of a storage operating system. Each physical server and each VM assigned to a hierarchical level are configured and assigned to provide the particular set of storage functions of the hierarchical level. As such, the particular set of storage functions assigned to a VM 103 depends on the hierarchical level 109 containing the physical server 102 on which the VM 103 is executing. Thus, the various storage functions provided by the storage operating system may be segregated by hierarchical levels, each hierarchical level (through use of physical servers and VMs) providing a particular set of storage functions of the storage operating system.

Each physical server 102 may include a hypervisor module/engine that executes on the server to produce and manage the VMs 103. The hypervisor may also virtualize the hardware and/or software resources of the servers for use by the VMs. The operating system of each VM 103 may utilize and communicate with the resources of the physical server via the hypervisor. As such, a hypervisor executing on a physical server is also assigned to the hierarchical level 109 containing the physical server. In some embodiments, the VM hierarchy module 50 may send a command/request to the hypervisor to produce VMs 103 configured to only perform the particular set of storage functions assigned to the hierarchical level to which the hypervisor is assigned. As such, each VM 103 is not configured and assigned to perform all storage functions of the storage operating system. In these embodiments, the hypervisor may configure the VMs 103 to not perform any other storage functions of the storage operating system other than the assigned set of storage functions.

In some embodiments, the storage system 105 may comprise first and second hierarchical levels 109. VMs assigned to the first hierarchical level 109 may be assigned to perform a set of storage transaction functions (e.g., for transacting storage requests). VMs assigned to the second hierarchical level 109 may be assigned to perform a set of storage access functions (e.g., for accessing storage devices). As such, the storage system may be configured such that different storage functions (e.g., storage transaction functions, storage access functions, etc.) are logically segregated such that they are performed only at a particular assigned hierarchical level (by VMs assigned to the particular hierarchical level). For example, all storage transaction functions may be performed only at the first hierarchical level, all storage access functions may be performed only at the second hierarchical level, etc.

Figure 1B:
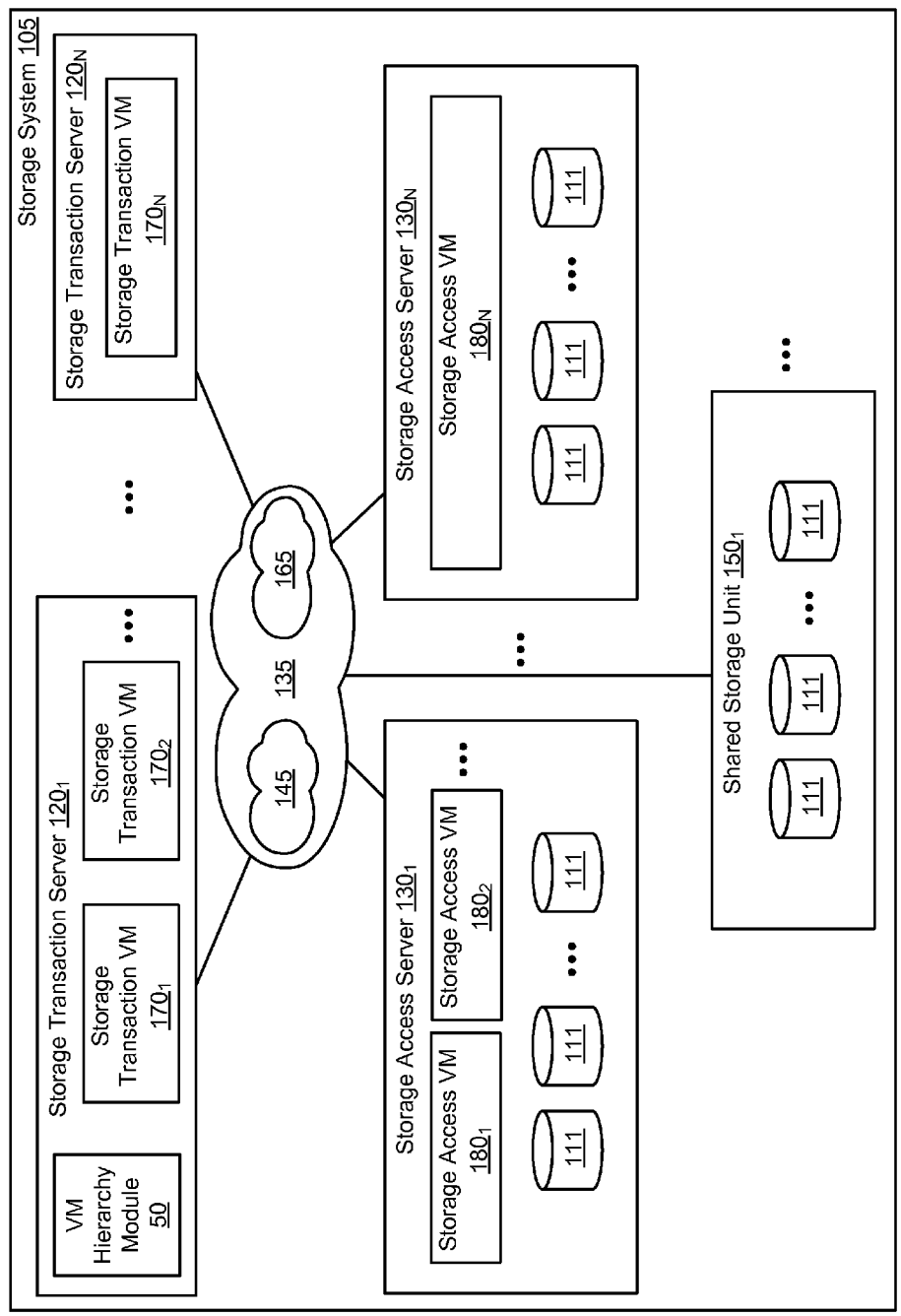
FIG. 1B is a block diagram of an exemplary storage system that may be used in the hierarchical virtual server environment.

FIG. 1B is a block diagram of an exemplary storage system 105 that may be used in the hierarchical virtual server environment 100 of FIG. 1A. The storage system 105 may comprise a plurality of physical servers 102 (comprising one or more storage transaction servers 120 and one or more storage access servers 130) that access storage devices 111. In some embodiments, the storage system 105 may comprise a chassis hosting the storage transaction servers 120, storage access servers 130, an inter-server network 135, and storage devices 111, any or all of which may be co-located within a single chassis (e.g., a blade server chassis, enclosure chassis, etc.).

In some embodiments, a VM hierarchy module 50 resides and executes on at least one of the physical servers 102. In the example of FIG. 1B, the VM hierarchy module 50 resides and executes on a storage transaction server 120. In other embodiments, the VM hierarchy module 50 resides and executes on a storage access server 130. In some embodiments, the VM hierarchy module 50 may receive hierarchy parameters from an administrator, such as the total number of physical servers 102 available to be used and the number of storage transaction servers 120, storage transaction VMs 170, storage access servers 130, and/or storage access VMs 180 to be produced.

Starting from a plurality of physical servers 102 (the total number of physical servers 102 available), the VM hierarchy module 50 may logically group and assign a first set of one or more physical servers 102 as a pool of storage transaction servers 120 and a second set of one or more physical servers 102 as a pool of storage access servers 130. The VM hierarchy module 50 may assign the pool of storage transaction servers 120 to a first hierarchical level (assigned to perform all storage transaction functions) and assign the pool of storage access servers 130 to a second hierarchical level (assigned to perform all storage access functions) of the storage system 105.

The storage system 105 may also comprise one or more conventional shared storage units 150 each comprising a set of storage devices 111. In some embodiments, the storage transaction functions of a storage transaction server 120 combined with the storage access functions of a storage access servers 130 may replace the overall storage functions provided by a conventional shared storage unit 150. In these embodiments, the storage transaction servers 120 and the storage access servers 130 may be used to store client data and provide data services without the use of the conventional shared storage units 150. In other embodiments, the conventional shared storage units 150 may be used in conjunction with the storage transaction servers 120 and the storage access servers 130 to store client data on storage devices 111 and provide data services to clients 110.

The storage transaction servers 120, the storage access servers 130, and the shared storage units 150 may be connected to each other through an inter-server network 135. As such, a storage transaction server 120 may access a storage access server 130 via the inter-server network 135. Note that the storage transaction servers 120 are also connected to each other via the inter-server network 135 for communicating with each other (e.g., for working collectively to provide data-access service to the client systems 110 and for collectively hosting a plurality of VMs as described herein).

The inter-server network 135 may comprise a local area network (LAN), an Ethernet subnet, a PCI or PCIe subnet, a switched PCIe subnet, a wide area network (WAN), a metropolitan area network (MAN), the Internet, or the like. The inter-server network 135 may include a packet-based sub-network 145 for communicating access requests by issuing packets using Internet Protocol-based (IP-based) access protocols—such as TCP/IP or UDP/IP, or Internet Small Computer System Interface (iSCSI)—when accessing data in the form of packets. The inter-server network 135 may include a block-based sub-network 165 for communicating access requests by using block-based access protocol (such as the Fibre Channel Protocol (FCP), or Serial Attached SCSI (SAS), or Storage Area Network (SAN) access) when accessing data in the form of blocks.

A client system 110 may comprise a computer system that may execute a client application that interacts with a storage system 105 for submitting storage access requests and for receiving or transmitting data from or to the storage access server 130 systems over the network 115. The client system 110 may request the services of the storage system 105 by issuing storage-access protocol messages formatted in accordance with a conventional storage-access protocol for accessing storage devices (such as CIFS, NFS, etc.). Access requests (e.g., configuration and/or read/write access requests) may be implemented by issuing packets using file-based access protocols—such as the Common Internet File System (CIFS) protocol or Network File System (NFS) protocol—over the Transmission Control Protocol/Internet Protocol (TCP/IP) when accessing data in the form of files and directories. Alternatively, a client system 110 may issue access requests by issuing packets using block-based access protocols—such as the Fibre Channel Protocol (FCP), or Internet Small Computer System Interface (iSCSI), FCoE (Fibre Channel over Ethernet), or Serial Attached SCSI (SAS)—when accessing data in the form of blocks.

The storage system 105 may respond to access requests (e.g., read/write requests) of the client systems 110 by receiving or transmitting data to or from the client systems 110 over the network 115 (e.g., by exchanging data packets through a connection over the network 115). In a virtual server environment, a client system 110 may execute a client terminal application that interacts over the network 115 with one or more virtual machines (VMs) executing on physical servers within the storage system 105 (e.g., storage transaction server 120, storage access server 130). A user may interface with the client system 110 (e.g., through a user interface of the client application) to submit configuration and/or access requests to the storage system 105.

Each storage transaction server 120 may comprise a computer system that executes one or more storage transaction VMs 170 for interacting with the client systems 110 and the storage access servers 130. Each storage transaction VM 170 may execute a separate storage operating system. In some embodiments, each storage transaction VM 170 may be configured and assigned to perform only storage transaction functions of the storage operating system. A storage transaction VM 170 may provide data-access services to client systems 110 by receiving and processing access requests (e.g., read/write requests) from the client systems 110 for accessing client data stored on storage devices 111 of the storage access server 130. A storage transaction VM 170 may route received access requests to a storage access server 130 which then accesses the storage devices 111 to perform the access request. The storage transaction VM 170 may then receive a response to the storage access request from the storage access server 130 and send the response to the client system 110 over the network 115.

Each storage access server 130 may comprise a computer system that executes one or more storage access VMs 180 for interacting with the storage transaction VMs 170 (executing on the storage transaction servers 120) and the storage devices 111. Each storage access VM 180 may execute a separate storage operating system. Each storage access VM 180 may be configured and assigned to perform only storage access functions of the storage operating system. For example, the storage transaction VM 170 may receive routed read/write access requests from the storage transaction VMs 170, access the storage devices 111 to perform the access request, and send a response to the storage transaction VMs 170.

For example, for a read request for requested client data, the response may comprise the requested client data. For a write request, the response may comprise a message indicating the write request has been completed. Storage access functions provided by a storage access VM 180 may include file-level access functions, block-level access functions, storage object-level access functions, etc. that may employ one or more file protocols (e.g., CIFS, SMB, NFS, etc.), one or more transport protocols (e.g., iSCSI, FCP, FCoE, SAS, SCSI, SATA, etc.), and/or one or more storage object protocols (e.g., SCSI OSD command set). A storage access server 130 that hosts a storage access VM 180 may be considered to be a storage device, and accordingly multiple such storage devices may be managed in a high-availability (e.g., RAID) group (discussed below in Section II).

Each shared storage unit 150 may comprise a computer system for interacting with the client systems 110 and storage devices 111. Each shared storage unit 150 may execute a storage operating system and is typically configured to perform all storage functions of the storage operating system, including the storage transaction and storage access functions as described above. A shared storage unit 150 will typically not implement any VMs for executing storage functions of the storage operating system.

The hardware and software components of the storage transaction servers 120, storage access servers 130, and the shared storage units 150 are discussed in detail below in relation to FIGS. 2-5. A method for producing a storage system 105 configured to have hierarchical levels 109 of physical servers 102 and VMs 103 based on storage functions is discussed in Section III in relation to FIG. 9.

B. Storage Access Server

Figure 2:
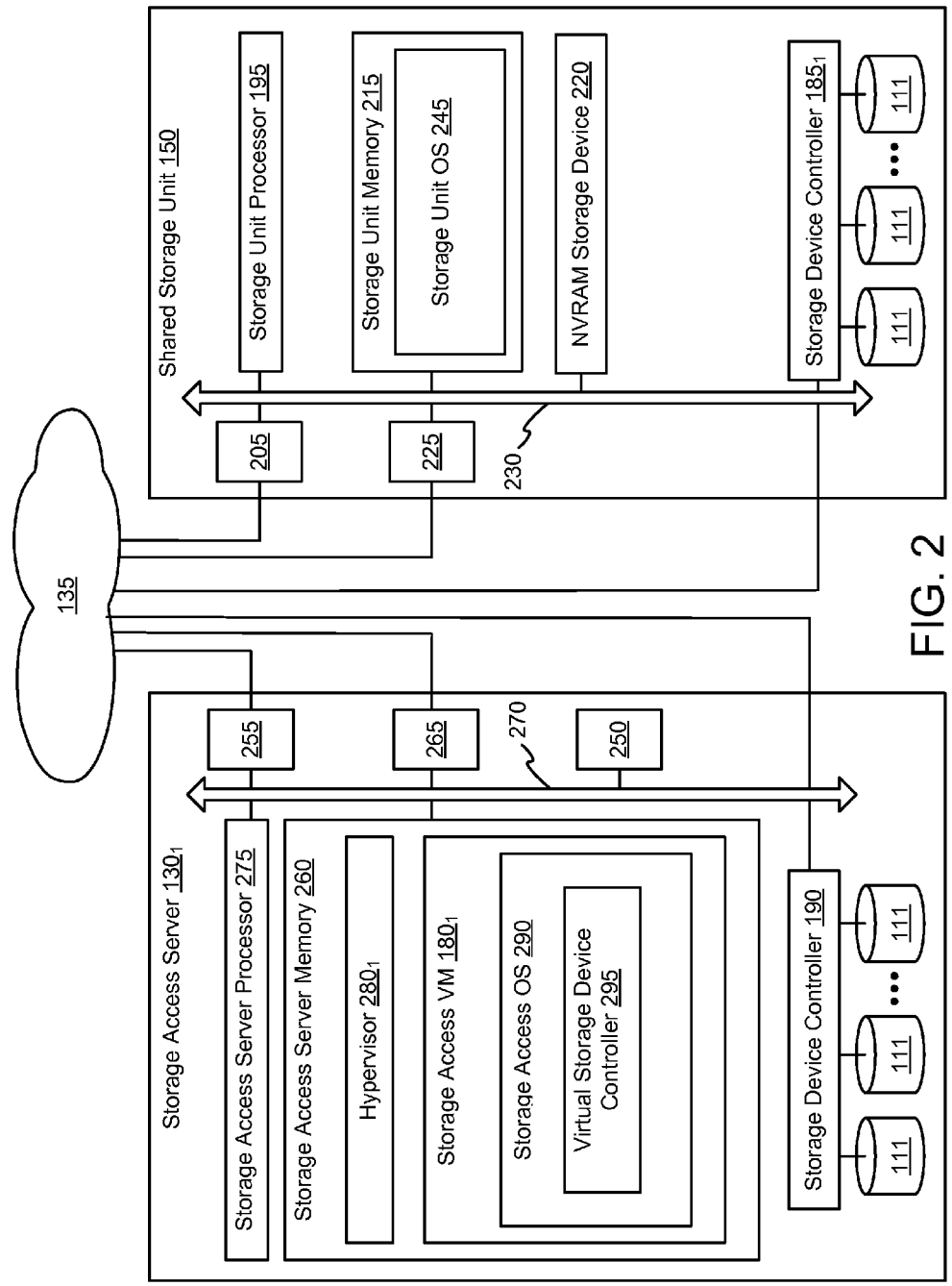
FIG. 2 is a schematic block diagram illustrating components of an exemplary shared storage unit and an exemplary storage access server in accordance with some embodiments.

FIG. 2 is a schematic block diagram illustrating components of an exemplary shared storage unit 150 and an exemplary storage access server 130 in accordance with some embodiments. Those skilled in the art will understand that the embodiments described herein of a shared storage unit 150 and a storage access server 130 may apply to any type of special-purpose computer or general-purpose computer, including a stand-alone computer. To that end, a shared storage unit 150 or a storage access server 130 can be broadly, and alternatively, referred to as a computer system. Moreover, the teachings of the embodiments described herein can be adapted to a variety of storage system architectures including, but not limited to, a network-attached storage environment, a storage area network, and a disk assembly directly attached to a server computer.

A shared storage unit 150 may comprise a storage unit processor 195, a network adapter 205, a storage unit memory 215, a non-volatile random access memory (NVRAM) storage device 220, a storage adapter 225, and a storage device controller 185 interconnected by a shared storage unit system bus 230 (which may comprise one or more bus architectures).

The storage device controller 185 may comprise a set of one or more storage devices 111. The storage device controller 185 may manage, access, and store data in the set of storage devices 111. The shared storage unit 150 utilizes services of the storage device controller 185 to store and access client data on the storage devices 111. A storage device controller 185 may further comprise facilities for managing a redundant array of independent storage devices (RAID). In some embodiments, a storage device controller 185 communicates with instruments measuring environmental conditions in and around the storage device controller 185 and for managing redundant components such as power supplies and fans.

In some embodiments, the storage device controller 185 may reside in the internal architecture of the shared storage unit 150 and is connected with the shared storage unit system bus 230. In these embodiments, the shared storage unit 150 may access the storage device controller 185 directly through the shared storage unit system bus 230. In other embodiments, the storage device controller 185 may reside outside of the shared storage unit 150 and be directly connected with the network 135. In these embodiments, the shared storage unit 150 may access the storage device controller 185 through the network 135 using the network adapter 205.

The network adapter 205 comprises the mechanical, electrical, and signaling circuitry needed to connect the shared storage unit 150 to a network 135. The shared storage unit may include one or more network adapters 205. Each network adapter 205 has one or more unique IP addresses and may provide one or more data access ports for client systems to access the shared storage unit 150 (where the network adapter 205 accepts read/write access requests from the network 135 in the form of data packets).

The storage unit memory 215 comprises storage locations that are addressable by the storage unit processor 195 and adapters for storing software program code and data. The storage unit memory 215 may comprise a form of random access memory (RAM) that is generally cleared by a power cycle or other reboot operation (e.g., it is "volatile" memory). In other embodiments, however, the storage unit memory 215 may comprise a non-volatile form of memory that does not require power to maintain information. The storage unit processor 195 and adapters may, in turn, comprise processing elements and/or logic circuitry configured to execute the software code and manipulate the data stored in the storage unit memory 215.

The shared storage unit 150 may also include a NVRAM storage device 220 that may be employed as a backup memory that ensures that the shared storage unit 150 does not "lose" received information, e.g., access requests, in the event of a system shutdown or other unforeseen problem. The NVRAM storage device 220 is typically a large-volume solid-state memory array (e.g., RAM) having either a back-up battery or other built-in last-state-retention capabilities that holds the last state of memory in the event of any power loss to the array. Therefore, even if an access request stored in storage unit memory 215 is lost or erased (e.g., due to a temporary power outage) it may still be recovered from the NVRAM storage device 220.

The storage unit processor 195 executes a storage unit operating system 245 for performing all storage functions of the storage operating system, including storage transaction and storage access functions. The storage unit processor 195 executes the storage unit operating system 245 that functionally organizes the shared storage unit 150 by, inter alia, invoking storage operations in support of storage access functions implemented by the shared storage unit 150. In some embodiments, the storage unit operating system 245 comprises a plurality of software layers that are executed by the storage unit processor 195. Portions of the storage unit operating system 245 are typically resident in storage unit memory 215. It will be apparent to those skilled in the art, however, that other processing and memory means, including various computer-readable media, may be used for storing and executing program instructions pertaining to the storage unit operating system 245.

The storage adapter 225 cooperates with the storage unit operating system 245 to access requested data on the storage devices 111. The storage adapter 225 includes input/output (I/O) interface circuitry that couples to the storage devices 111 via an I/O interconnect arrangement, such as a conventional high-performance Fibre Channel serial link topology. In response to an access request received from a client system 110, data may be retrieved by the storage adapter 225 and, if necessary, processed by the storage unit processor 195 (or the storage adapter 225 itself) prior to being forwarded to the client system 110.

In some embodiments, the storage device controller 185 comprises one or more storage devices 111 that are arranged into a plurality of volumes, each having a file system associated therewith. In some embodiments, the storage device controller 185 comprises storage devices that are configured into a plurality of RAID groups whereby two or more storage devices 111 are combined into a single logical unit (i.e., a RAID group). In a typical RAID group, the storage devices 111 of the RAID group share or replicate data among the storage devices, which may increase data reliability or performance. The storage devices 111 of a RAID group are configured so that some storage devices store striped data and at least one storage device stores separate parity data for the client data. However, other configurations (e.g., RAID-5 having distributed parity across stripes, RAID-DP, etc.) are also contemplated. A single volume typically comprises a plurality of storage devices 111 and may be embodied as a plurality of RAID groups.

A storage access server 130 may comprise some components similar to the components described above for the shared storage unit 150, the basics of such components which are discussed in detail above. Additional features or functions of the components of the storage access server 130 are discussed below. The storage access server 130 may comprise a storage access server processor 275, a network adapter 255, a storage access server memory 260, a non-volatile random access memory (NVRAM) storage device 250, a storage adapter 265, and a storage device controller 190 interconnected by a storage access system bus 270 (which may comprise one or more bus architectures).

The storage device controller 190 may comprise a set of one or more storage devices 111. The storage access server 130 utilizes services of the storage device controller 190 to manage, access, and store data client data on the storage devices 111. In some embodiments, the storage device controller 190 may reside in the internal architecture of the storage access server 130 and is connected with the shared storage access system bus 270. In other embodiments, the storage device controller 190 may reside outside of the storage access server 130 and be directly connected with the network 135. In these embodiments, the storage access server 130 may access the storage device controller 190 through the network 135 using the network adapter 255.

A storage device controller 190 may further comprise facilities for managing a redundant array of independent storage devices (RAID). In some embodiments, the storage device controller 190 comprises two or more storage devices 111 that are arranged into a plurality of blocks. In one embodiment, the storage device controller 190 comprises storage devices that are configured into a plurality of RAID groups whereby two or more storage devices 111 are combined into a single logical unit (i.e., a RAID group).

The storage access server 130 may include one or more network adapters 255. Each network adapter 255 has one or more unique IP addresses and may provide one or more data access ports for interacting with the client systems 110 (through the network 115) and the storage transaction servers 120 (through the network 135). For example, the network adapter 255 may accept read/write access requests from the storage transaction servers 120 through the packet-based sub-network 145 in the form of data packets. In some embodiments, the network adapter 255 comprises a bus card that communicates over the storage access server system bus 270 via an I/O interconnect. For example, the network adapter 255 may be a module (e.g., a physical network adapter) on a Peripheral Component Interconnect (PCI) or PCI eXtended (PCI-X) card that is connected with the storage access server system bus 270. As another example, a network adapter 255 may comprise a virtual network adapter implemented by virtual LAN (VLAN) tagging on a physical network. The network adapter 255 or a virtual network adapter implemented by VLAN-tagging may participate in the allocation of resources (e.g., bandwidth allocation, memory allocation, priority assignments, etc.) between the different logical uses of the network. A VLAN may be assigned to carry traffic between homogeneous storage devices. For example, a VLAN may be formed for carrying data to and from a plurality of NVRAM devices.

The storage access server memory 260 comprises storage locations that are addressable by the storage access server processor(s) 275 and adapters for storing software program code and data. The storage access server processor(s) 275 and adapters may, in turn, comprise processing elements and/or logic circuitry configured to execute the software code and manipulate the data stored in the storage access server memory 260. The storage access server memory 260 may include a hypervisor engine/module 280 and one or more storage access VM 180 executed by the storage access server processor(s) 275 and adapters.

A storage access server 130 executes a hypervisor engine/module 280 that produces one or more VMs 103 including at least one storage access VM 180 each executing a storage access operating system 290. Conceptually, the storage access operating system 290 may comprise a set of storage access functions of an overall storage operating system, the storage access functions comprising a sub-set of the overall functions provided by the storage operating system. In these embodiments, the storage access VM 180 may be configured to perform only storage access functions of the storage operating system and is not configured to perform all storage functions provided by the storage operating system. The storage access VM 180 may be configured to do so, for example, by the hypervisor 280 which generates, configures, and deploys the storage access VM 180. In other embodiments, the storage access operating system 290 may comprise a special purpose operating system that provides only storage access functions.

In some embodiments, the storage access operating system 290 functionally organizes the storage device controller 190 by invoking storage operations in support of storage access functions implemented by the storage access server 130. In some embodiments, the storage access operating system 290 may be similar to the storage unit operating system 245 but performs only storage access functions. In some embodiments, the storage access operating system 290 comprises a plurality of software layers. Portions of the storage access operating system 290 are typically resident in the storage access server memory 260. It will be apparent to those skilled in the art, however, that other processing and memory means, including various computer-readable media, may be used for storing and executing program instructions pertaining to the storage access operating system 290.

The storage adapter 265 cooperates with the storage access operating system 290 to access requested data on the storage devices 111. In response to an access request received from a client system 110, data may be retrieved by the storage adapter 265 and, if necessary, processed by the storage access VM 180 (or the storage adapter 265 itself) prior to being forwarded to the client system 110. In some embodiments, the storage adapter 265 comprises a bus card that communicates over the storage access server system bus 270 via an I/O interconnect. For example, the storage adapter 265 may be a module on a Peripheral Component Interconnect (PCI) or PCI eXtended (PCI-X) card that is connected with the storage access server system bus 270.

A storage device 111 may comprise writable storage device media such as disk devices, video tape, optical devices, DVD, magnetic tape, flash memory, Magnetic Random Access Memory (MRAM), Phase Change RAM (PRAM), solid state memory devices, or any other similar media adapted to store information (including data and parity information). A storage device 111 may comprise a low-latency random read memory (referred to herein as "LLRRM"). Some examples of LLRRM devices include flash memory, non-volatile random access memory (NVRAM), Magnetic Random Access Memory (MRAM), Phase Change RAM (PRAM), etc. A storage device 111 may comprise specialized writable storage device media such as a serial ATA (SATA) drive or may comprise two or more SATA drives with a bridge.

In some embodiments, one or more storage devices 111 are configured so as to enable export of various types of storage access (e.g., access to an independent physical disk, access to a RAID group, access to one or more partitions, access to one or more slices of a RAID group, access to a block-oriented storage device, access to a file-oriented storage device, access to a storage object-oriented storage device, access via a block-level access interface, access via a file-level access interface, or access via a storage object-level access interface).

As known in the art, a storage device 111 may have one or more storage volumes, where each volume has a file system implemented on the volume. A file system implemented on the storage devices 111 may provide one or more directories in a single volume, each directory containing zero or more filenames. A file system provides a logical representation of how data (files) are organized on a volume where data (files) are represented as filenames that are organized into one or more directories. Examples of common file systems include New Technology File System (NTFS), File Allocation Table (FAT), Hierarchical File System (HFS), Universal Storage Device Format (UDF), UNIX® file system, and the like. The Data ONTAP® storage operating system (available from NetApp, Inc. of Sunnyvale, Calif.) may implement a Write Anywhere File Layout (WAFL®) file system.

C. Storage Transaction Server

Figure 3:
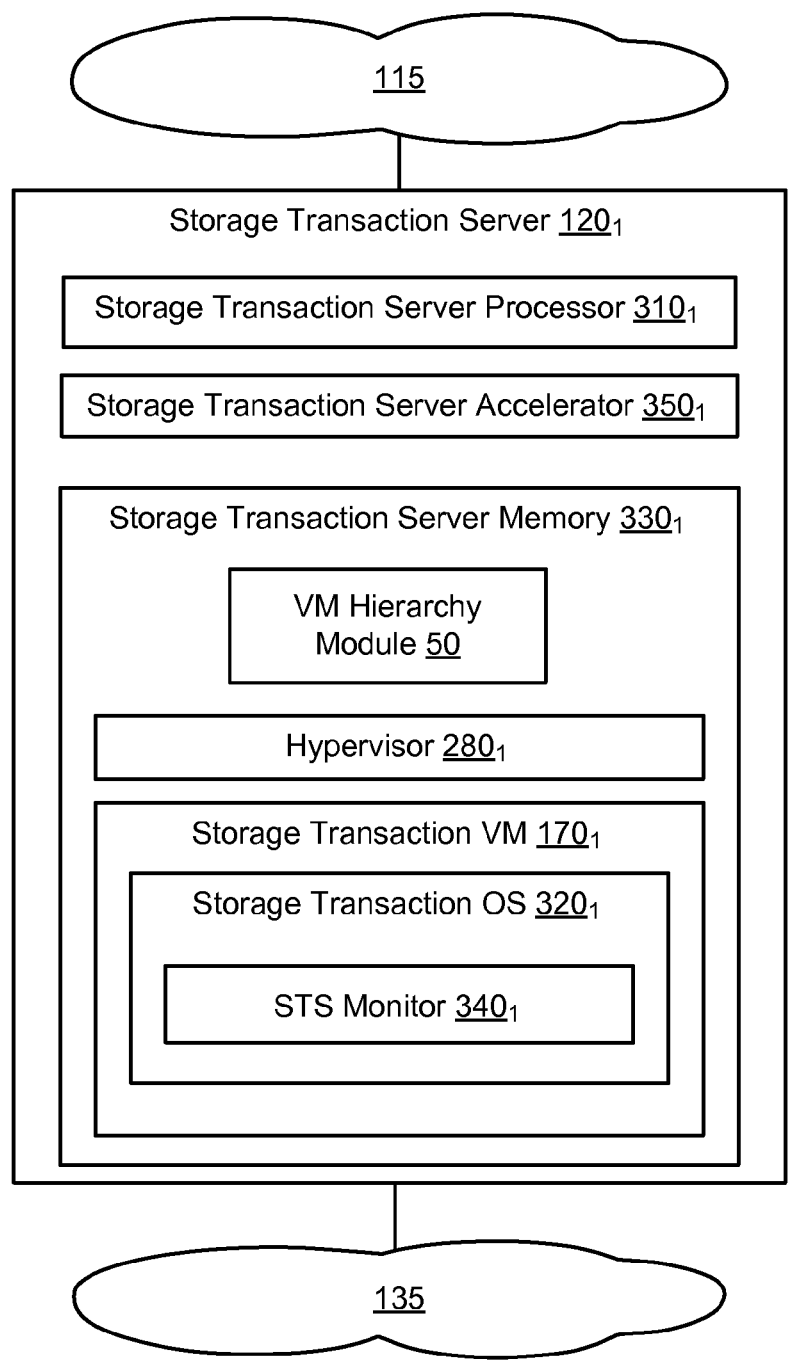
FIG. 3 is a schematic block diagram illustrating various components of an exemplary storage transaction server, in accordance with some embodiments.

FIG. 3 is a schematic block diagram illustrating various components of an exemplary storage transaction server 120, in accordance with some embodiments. Those skilled in the art will understand that the embodiments of the storage transaction servers described herein may apply to any type of special-purpose computer or general-purpose computer, including a stand-alone computer. To that end, a storage transaction server 120 can be broadly, and alternatively, referred to as a computer system. Moreover, the teachings of the embodiments described herein can be adapted to a variety of storage transaction server architectures including, but not limited to, a uni-processor system, a shared memory multi-processor system, a symmetric multi-processor system, or a node or nodes within a computing cluster. The term "storage transaction server" should, therefore, be taken broadly to include such arrangements.

A storage transaction server 120 may comprise some components similar to the components described above for the storage access server 130 and are not discussed in detail here (such as an NVRAM storage device 250 for persisting a transaction state for completing or aborting transactions on power or system failure during the transaction, etc.). The storage transaction server 120 may comprise a storage transaction server processor 310, a storage transaction server accelerator 350, and a storage transaction server memory 330.

The storage transaction server memory 330 comprises storage locations that are addressable by the storage transaction server processor(s) 310 and adapters for storing software program code and data. The storage transaction server processor(s) 310 and adapters may, in turn, comprise processing elements and/or logic circuitry configured to execute the software code and manipulate the data stored in the storage transaction server memory 330. The storage transaction server memory 330 may include a VM hierarchy module 50, a hypervisor 280, and a storage transaction VM 170 executed by the storage transaction server processor(s) 310 and adapters.

A storage transaction server 120 executes a hypervisor engine/module 280 that produces one or more VMs 103 including at least one storage transaction VM 170 each executing a storage transaction operating system 320. Conceptually, the storage transaction operating system 320 may comprise a set of storage transaction functions of an overall storage operating system, the storage transaction functions comprising a sub-set of the overall functions provided by the storage operating system. In these embodiments, the storage transaction VM 170 may be configured to perform only storage transaction functions of the storage operating system and is not configured to perform all storage functions provided by the storage operating system. The storage transaction VM 170 may be configured to do so, for example, by the hypervisor 280 which generates, configures, and deploys the storage transaction VM 170. In other embodiments, the storage transaction operating system 320 may comprise a special purpose operating system that provides only storage transaction functions.

In general, the storage transaction operating system 320 functionally organizes communication between a client system 110 and a storage access server 130. The storage transaction operating system 320 may do so by receiving storage access requests from client systems 110 and generating storage operations based on the received storage access requests and routing the storage operations to one or more storage access servers 130 for execution.

In exemplary embodiments, a client system 110 connects to a storage transaction server 120 over a network 115 (see FIG. 1), and requests storage services. The storage transaction server 120, in turn, authenticates the client system 110 and the request for storage access services, and processes the request for storage access services, possibly involving two or more storage transaction servers 120. In some embodiments, two or more storage transaction servers $120_1$-$120_N$ may be organized into a logical grouping comprising a pool of storage transaction servers.

In some embodiments, a storage transaction operating system 320 accepts storage access requests from client systems 110 and services each access request as a transaction. For each access request, a transaction may comprise a group of two or more sub-requests. The success of a transaction may be reported as successful indicating success of all sub-requests. Alternatively, failure of a transaction may be reported in the event that any one of the sub-requests failed. A transaction is performed by routing one or more sub-requests for the sub-requests to one or more other storage transaction servers 120 and/or to one or more storage access servers 130 that execute the sub-requests.

A storage transaction server 120 may include a storage transaction server accelerator 350 for accelerating the processing of storage access requests. A storage transaction server accelerator 350 may perform classification of a storage access request, determination of one or more transactions comprising the storage access request, determination of one or more sub-requests comprising the transaction, and routing sub-requests for the one or more sub-requests to other instances of storage transaction servers or to one or more storage access servers 130 that execute the sub-requests.

A storage transaction server 120 receives storage access requests from client system 110, and maintains the state for such requests in order to provide transactional integrity when executing the request. A storage transaction server 120 may submit sub-requests for sub-requests from other instances of storage transaction servers 120. Thus, the state of a client system 110 access request may be located at a plurality of storage transaction servers 120.

In some embodiments, some storage access requests from client systems 110 may be formed into a call-response request, where a single storage access request is satisfied by a single response. Other storage access requests from client systems 110 may be formed into two or more conversational transactions, where a single storage access request may be satisfied by two or more responses. For example, a client system storage request for access to a file may be satisfied by returning two or more of responses, each response comprising a successive block of the file. Still other storage access requests from client systems 110 may be formed into an atomic transaction request, where a valid response to a single request comprises two or more transactions yielding two or more responses, all of which responses must be deemed successful in order for the atomic transaction to be deemed completed.

In some embodiments, the storage transaction operating system 320 comprises a storage transaction server (STS) monitor 340 that is executed by the storage transaction server processor 310. The STS monitor 340 may monitor the performance and other operational characteristics of the storage access servers 130. In exemplary embodiments, a STS monitor 340 serves to balance computing load between the two or more physical servers possibly organized into a storage access server pool. The STS monitor 340 may assign priorities to different application server pools, and may optimize routing based on measured or calculated response times.

The STS monitor 340 may also monitor the operational health of the storage access servers 130. In exemplary embodiments, a STS monitor 340 serves to recognize a failed storage access server, and may assign (e.g., reassign and/or redirect) client system requests to a different storage access server 130. To do so, the STS monitor 340 may establish checkpoints and save certain state variables of each storage access server 130. Such checkpoints are used in starting/stopping a storage access server 130, and are used in restoring system state in the event of a failure of one or more storage access servers 130.

In some cases, when a particular storage access server fails, the STS monitor 340 identifies characteristics of the failure and invokes a rebuild operation for restoring the integrity of any data of the storage system affected by the failure of the storage access server 130. When a particular storage access server fails, the STS monitor 340 identifies a checkpoint state (e.g., a state of stored data, or a state of a transaction processing log, etc.) just prior to the failure, and cancels (backs out of) any incomplete atomic transactions. The STS monitor 340 allocates a replacement instance of a storage access VM 180 to serve instead of the failed instance of the storage access server, and the STS monitor 340 establishes the aforementioned checkpoint for the replacement instance of the storage access server 130.

D. Storage Operating System

Figure 4:
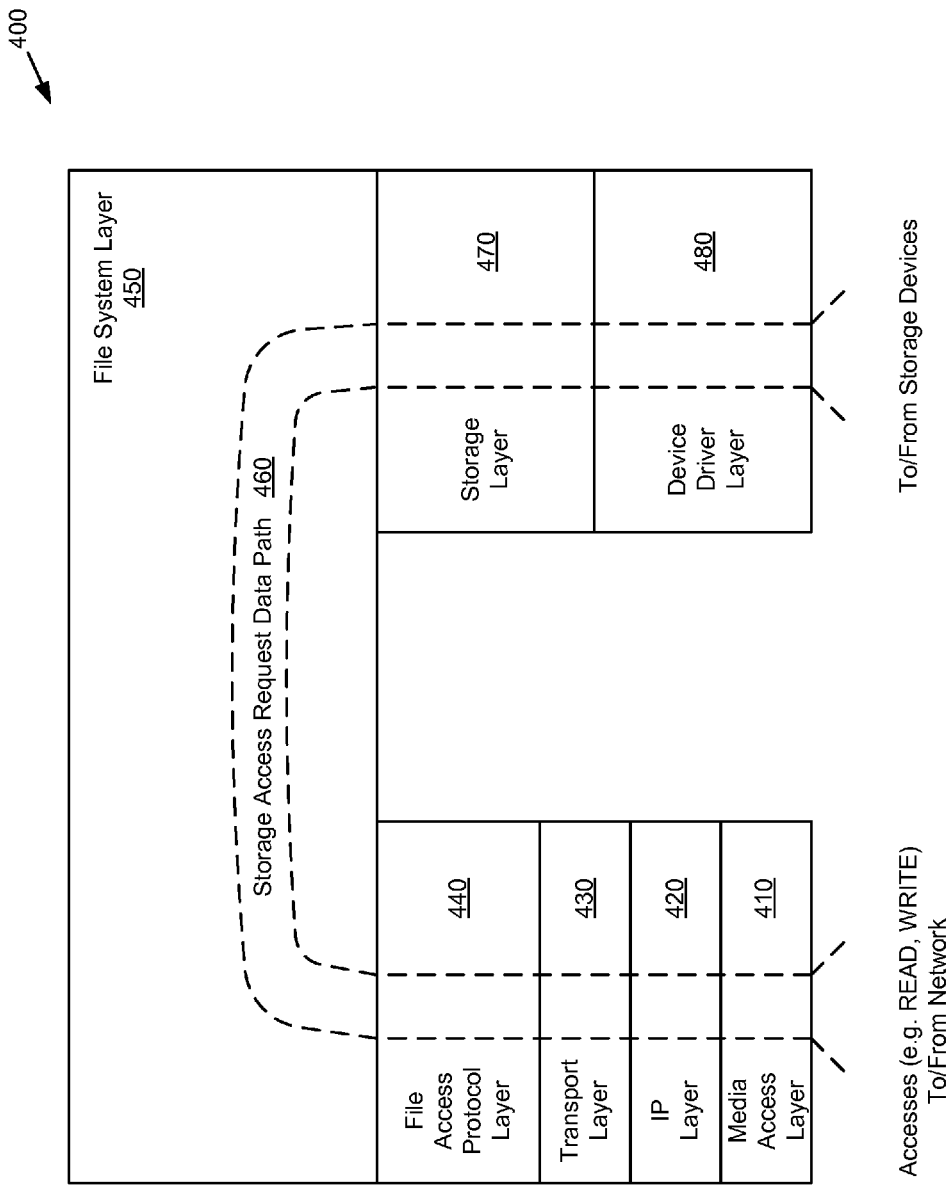
FIG. 4 is a schematic block diagram of an exemplary storage operating system.

The organization of a storage operating system is now described briefly in relation to FIG. 4. However, it is expressly contemplated that the principles of the embodiments described herein can be implemented using a variety of alternative storage operating system architectures. As discussed above, the term "storage operating system" generally refers to the computer-executable code operable on a computer processor that manages data access. In this sense, Data ONTAP® operating system is an example of such a storage operating system implemented as a microkernel. The storage operating system can also be implemented as an application program operating over a special-purpose embedded operating system such as a Real-Time Operating System (RTOS), or as an application program operating over a general-purpose operating system, such as UNIX™ or Windows™, or as a general-purpose operating system with configurable functionality.

The storage operating system may comprise the storage unit operating system 245, the storage access operating system 290, and/or the storage transaction operating system 320. As described above, however, the storage unit operating system 245 may perform all storage functions of the storage operating system, while the storage access operating system 290 may be configured to perform only storage access functions of the storage operating system and the storage transaction operating system 320 may be configured to perform only storage transaction functions of the storage operating system.

FIG. 4 is a schematic block diagram of an exemplary storage operating system. As shown in FIG. 4, the storage operating system 400 comprises a series of software layers that form an integrated protocol stack that may be implemented by the aforementioned storage systems. The protocol stack provides data paths 460 for client systems 110 to access data stored on storage devices 111 using file-access protocols. The protocol stack includes a media access layer 410 of network drivers (e.g., an Ethernet driver). The media access layer 410 interfaces with network communication and protocol layers, such as the Internet Protocol (IP) layer 420 and the transport layer 430 (e.g., TCP/IP, UDP/IP protocols). The IP layer 420 may be used to provide one or more data access ports for a storage access server 130 to access the storage devices 111. In some embodiments, the IP layer 420 layer provides a dedicated private port for each of one or more remote-file access protocols implemented by the storage system 105.

A file-access protocol layer 440 provides multi-protocol data access and, for example, may include support for the Hypertext Transfer Protocol (HTTP) protocol, the NFS protocol, and the CIFS protocol. The storage operating system 400 (e.g., storage access operating system 290, storage unit operating system 245, storage transaction operating system 320) may include support for other protocols, including, but not limited to, the direct access file system (DAFS) protocol, the web-based distributed authoring and versioning (Web-DAV) protocol, the Internet small computer system interface (iSCSI) protocol, Fibre Channel over Ethernet (FCoE) protocol, and so forth. The storage operating system 400 may manage the storage devices 111 using a storage layer 470 that implements a storage protocol (such as a RAID protocol) and a device driver layer 480 that implements a device control protocol (such as small computer system interface (SCSI), integrated drive electronics (IDE), etc.).

Bridging the storage device software layers with the network and file-system protocol layers is a file system layer 450 of the storage operating system. In an illustrative embodiment, the file system layer 450 implements a file system having an on-disk format representation that is block-based using, for example, 4 KB data blocks. For each data block, the file system layer 450 may assign/associate a unique storage system address (e.g., a unique LBN) for storing data blocks in the set of storage devices. The file system layer 450 also assigns, for each file, a unique inode number and an associated inode. An inode may comprise a data structure used to store information about a file, such as ownership of the file, access permission for the file, size of the file, name of the file, location of the file, etc. Each inode may also contain information regarding the block locations of the file. In some embodiments, the block locations are indicated by LBNs assigned for each block of the file.

In response to receiving a storage access request, the file system generates operations to load (retrieve) the requested data from the storage devices. If the information is not already resident in the storage unit memory 215, the file system layer 450 indexes into an inode using the received inode number to access an appropriate entry and retrieve a storage system address (e.g., LBN). The storage system address may then be used by the file system layer 450, storage layer 470, and an appropriate driver of the device driver layer 480 to access the requested storage system address from the storage devices. The requested data may then be provided for further processing by the storage system 105. Upon successful completion of the request, the storage operating system 400, returns a response and in turn, the storage system 105 returns a response (e.g., a conventional acknowledgement packet defined by the CIFS specification) to the client system 110 over the inter-server network 135.

It should be noted that the software data path 460 through the storage operating system layers described above needed to perform data storage access for the requests received at the storage system may alternatively be implemented in hardware or a combination of hardware and software. That is, in an alternative embodiment, the storage access request data path 460 may be implemented as logic circuitry embodied within a field programmable gate array (FPGA) or an application specific integrated circuit (ASIC). This type of hardware implementation may increase the performance of the data access service provided by shared storage unit 150 in response to a storage access system request issued by client system 110. Moreover, in a further embodiment, the processing elements of network adapters and storage adapters may be configured to process some or all of the packet processing and storage access operations, respectively to thereby increase the performance of the data access service provided by the storage system.

In some embodiments, a VM hierarchy module 50 resides and executes on at least one of the physical servers 102. The VM hierarchy module 50 may produce hierarchical levels 109 of physical servers 102 and VMs 103 based on storage functions. The VM hierarchy module 50 may do so by sending commands/requests to the various components (e.g., hypervisor, operating system, etc.) of a plurality of physical servers 102 for dividing the plurality of physical servers 102 and VMs 103 into two or more hierarchical levels 109 as described below.

II. High-Availability of Storage Systems in a Hierarchical Virtual Server Environment In some embodiments, a plurality of storage access servers may be organized into a redundant array of storage access servers (RASAS) for providing data reliability and high-availability of the storage system. In these embodiments, for each received access request, a storage transaction server produces and routes at least two sub-requests ("storage access sub-requests") for execution by at least two storage access servers organized in a RASAS configuration.

The RASAS may be organized based on a selected redundancy configuration, such as a mirroring configuration (whereby client data in a first storage access server is mirrored in a second storage access server), a striping/mirroring configuration (whereby client data is striped across a first storage access server and a second storage access server), etc. In other embodiments, the RASAS may be organized based on other redundancy configurations such as storing a second copy of the client data with a checksum, storing three or more copies of the client data, storing client data with an erasure code, etc. In these embodiments, for each received access request, the storage transaction server may produce at least two storage access sub-requests based on the RASAS configuration type used (whereby the storage access sub-requests are produced specifically for the RASAS configuration type).

For example, if the RASAS is organized in a mirroring configuration, a storage transaction server may receive a write request (comprising client data to be stored) and produce first and second storage access sub-requests, each storage access sub-request specifying that all of the client data be stored. The first storage access sub-request may be received and executed by a first storage access server (which stores the received client data on its storage devices) and the second storage access sub-request may be received and executed by a second storage access server (which stores the received client data on its storage devices). As such, the client data is mirrored across the first and second storage access servers for providing data reliability and high-availability of the storage system.

In some embodiments, a storage access server further contains a storage access server memory for storing software application instructions and a storage access server processor for executing the software applications instructions. The software application instructions executed by the processor may include instructions for receiving storage access sub-requests from a storage transaction server and executing the storage access sub-requests on its set of storage devices. In some embodiments, each storage access server may implement one or more storage access VMs, each storage access VM executing a storage operating system that provides an overall set of storage functions but is configured to perform only storage access functions of the overall storage functions provided by the storage operating system. In these embodiments, a storage access VM is configured for receiving storage access sub-requests from the storage transaction server and executing the storage access sub-requests on its set of storage devices.

In further embodiments, the at least two storage access sub-requests received at the at least two storage access servers may implement a RASAS including storing client data using an erasure code. In some embodiments, an erasure code with a particular degree of redundancy is selected, and the organization of the RASAS may be formed so as to facilitate rebuilding of client data in the event of a detected failure of a component of the hierarchical virtual server environment. Selecting an erasure code with a particular degree of redundancy may involve trade-offs between the extent of a defined failure domain for which a recovery scheme is implemented, versus the cost and complexity of managing the data integrity within the failure domain, versus the predicted frequency of a failure, and versus the cost and complexity of implementing a recovery.

A storage transaction server may monitor received storage requests and monitor the operational health of the storage access servers, and may establish checkpoints to be used in restoring system state in the event of certain types of failures of one or more storage access servers. A storage transaction server monitor identifies characteristics of the failure and invokes a rebuild operation for restoring the integrity of any client data affected by the failure.

Defining a failure domain to include relatively more components (e.g. including an entire physical server) as compared to defining a failure domain to include relatively fewer components (e.g. just a hard disk drive) increases the likelihood that a failure will occur within a given time period. However, while replacement of a failed hard drive might require human intervention (e.g. to physically remove the failed drive and replace it with a replacement drive), the replacement of an entire storage access server might be accomplished fully automatically under control of a storage transaction server by assigning a new storage access server from a pool of physical servers, and deploying a new instance of a storage access server OS within a VM on the newly assigned storage access server. A storage transaction server may be configured as described below.

Figure 5:
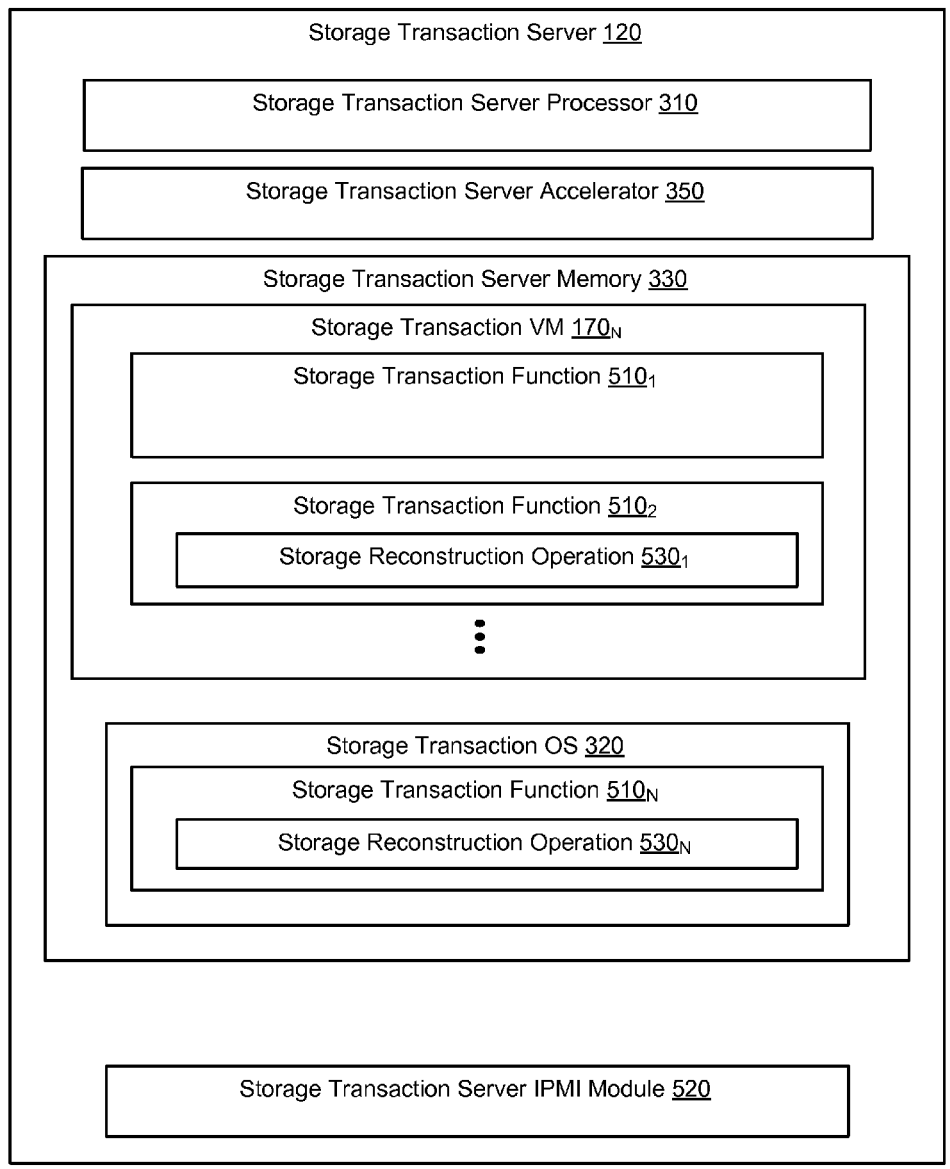
FIG. 5 is a schematic block diagram of an exemplary storage transaction server, in accordance with some embodiments.

FIG. 5 is a schematic block diagram of an exemplary storage transaction server, in accordance with some embodiments. In some embodiments, the storage transaction server 120 might host a storage transaction server processor 310 and a storage transaction server accelerator (e.g., an N-blade) in addition to memory space for a storage transaction server memory 330 within which memory the code and data for a storage transaction function 510 might be stored. As shown a storage transaction function 510 (e.g., storage transaction function $510_N$) might be a function within a storage transaction operating system 320. Or a storage transaction function (e.g., storage transaction function $510_1$) might be a function within a general-purpose operating system.

A storage transaction server accepts storage requests from client systems and services them as a transaction. For purposes of the disclosure herein, a transaction may be embodied as a group of sub-requests. The sub-requests are performed or scheduled to be performed, and the success or failure of sub-requests is monitored such that a transaction can be deemed to have succeeded, or deemed as having failed. In some embodiments, storage transaction server accepts a storage requests from a client system and forms pairs comprising a storage access request sub-request and a corresponding storage access request monitor action. The sub-request is communicated to a storage access server, and the corresponding monitor action is stored for later (possibly periodic) checking in order to monitor the success or failure the corresponding (paired) sub-request. A monitor action may be embodied as a process or sub-request monitoring virtual machine within a storage transaction server.

A particular storage transaction server may accept a storage request from a client system and may then communicate all or part of the storage request to a selected second storage transaction server. In turn, a second storage transaction server may then communicate all or part of the storage request to yet another storage transaction server. A particular storage transaction server may embody a storage transaction function 510 for selecting one or more storage transaction servers for servicing all or part of the storage request. The selection function for selecting one or more storage transaction servers from candidate storage transaction servers may include criteria including utilization of the candidate storage transaction servers, configuration of the candidate storage transaction servers, transaction type, etc.

Recovery for a particular transaction may or may not require re-execution of the entire sequence of sub-requests. In some cases a particular failed sub-request or group of sub-requests may be replayed. In some cases, replay of sub-requests comprising a transaction may be carried out by following a protocol as may be imposed by the storage protocol and the type of request, and such a protocol might be implemented by a storage transaction function 510.

As earlier described, a set of storage functions may sometimes be referred to as a mode set of storage functions (mode). Assignment of storage transaction functions 510 may be performed according to a set of rules, and some storage functions may be assigned to a storage transaction server 120 executed within storage transaction server memory as a storage transaction function 510. Other some storage functions may be assigned to a storage transaction server 120, and executed within storage transaction server memory as a storage transaction function 510. Some storage functions may be assigned to a storage transaction server 120, and may employ hardware and software for carrying out the function. For example, a storage transaction server 120 might include a storage transaction server IPMI module 520 for performing enclosure management, and such a module might employ both hardware (e.g., instrumentation) and software (e.g., an IPMI protocol interface).

Figure 6:
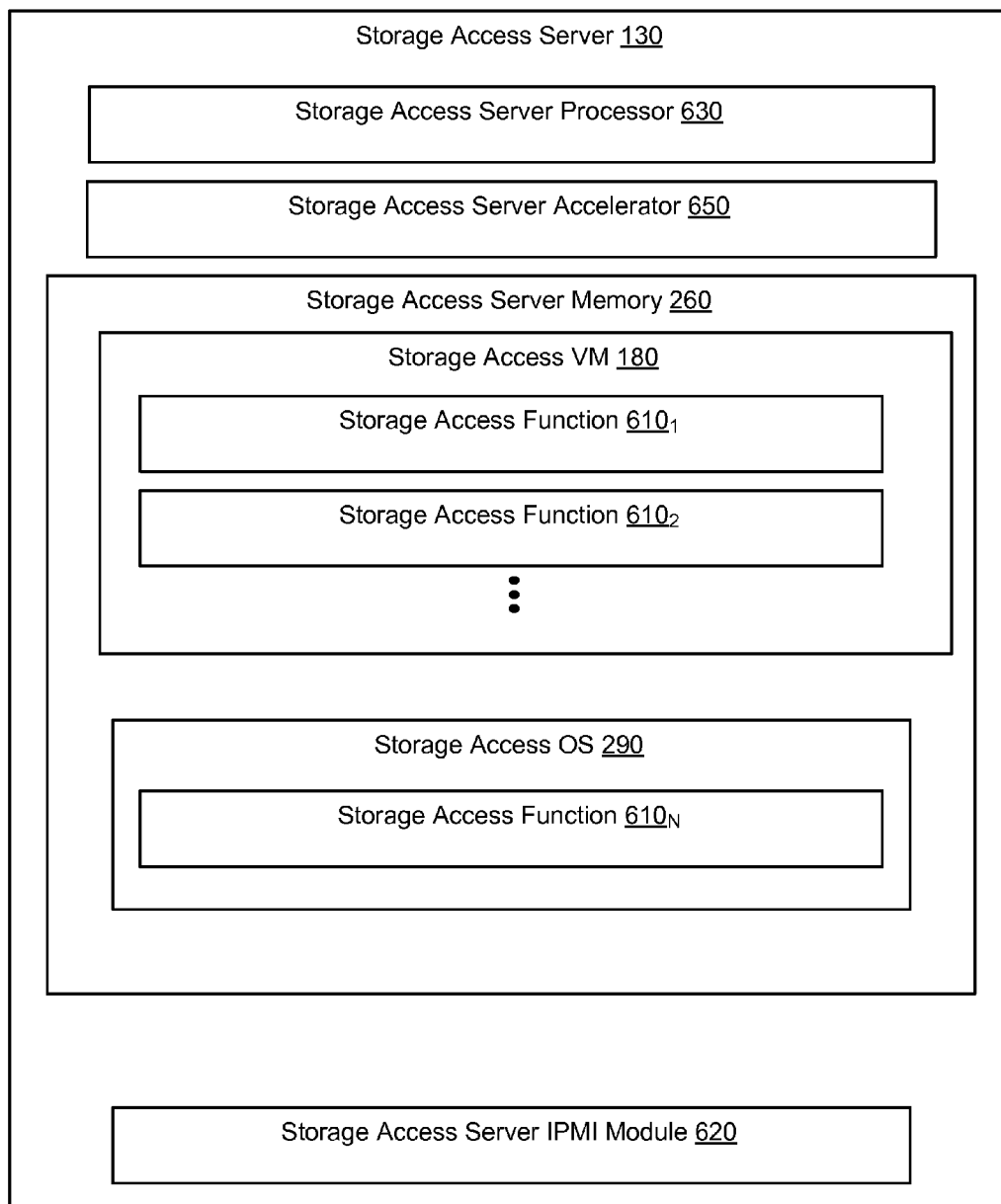
FIG. 6 is a schematic block diagram of an exemplary storage access server, in accordance with some embodiments.

FIG. 6 is a schematic block diagram of an exemplary storage access server, in accordance with some embodiments. As shown in FIG. 6, the storage access server 130 hosts a storage access server processor 630 and a storage access server accelerator (e.g., a D-blade) in addition to memory space for a storage access server memory 260 within which memory code and data for a storage access function 610 might be stored. As shown a storage access function (e.g., storage access function $610_N$) might be a function within a storage access operating system 290. Or a storage access function (e.g., storage access function $610_1$) might be a function within a general-purpose operating system.

A storage access server 130 accepts storage requests from a storage transaction server 120 and services the requests. A storage access server may access any combination of storage devices (e.g., disks, NVRAM devices, etc), for servicing the access request.

As earlier described, a set of storage functions may sometimes be referred to as a mode set of storage functions (mode). Assignment of storage access functions 610 may be performed according to a set of rules, and some storage functions may be assigned to a storage access server 130 executed within storage access server memory as a storage access function 610. Some storage functions may be assigned to a storage access server 130, and may employ hardware and software for carrying out the function. For example, a storage access server 130 might include a storage access server IPMI module 620 for performing enclosure management, and such a module might employ both hardware (e.g., instrumentation) and software (e.g., an IPMI protocol interface).

Figure 7:
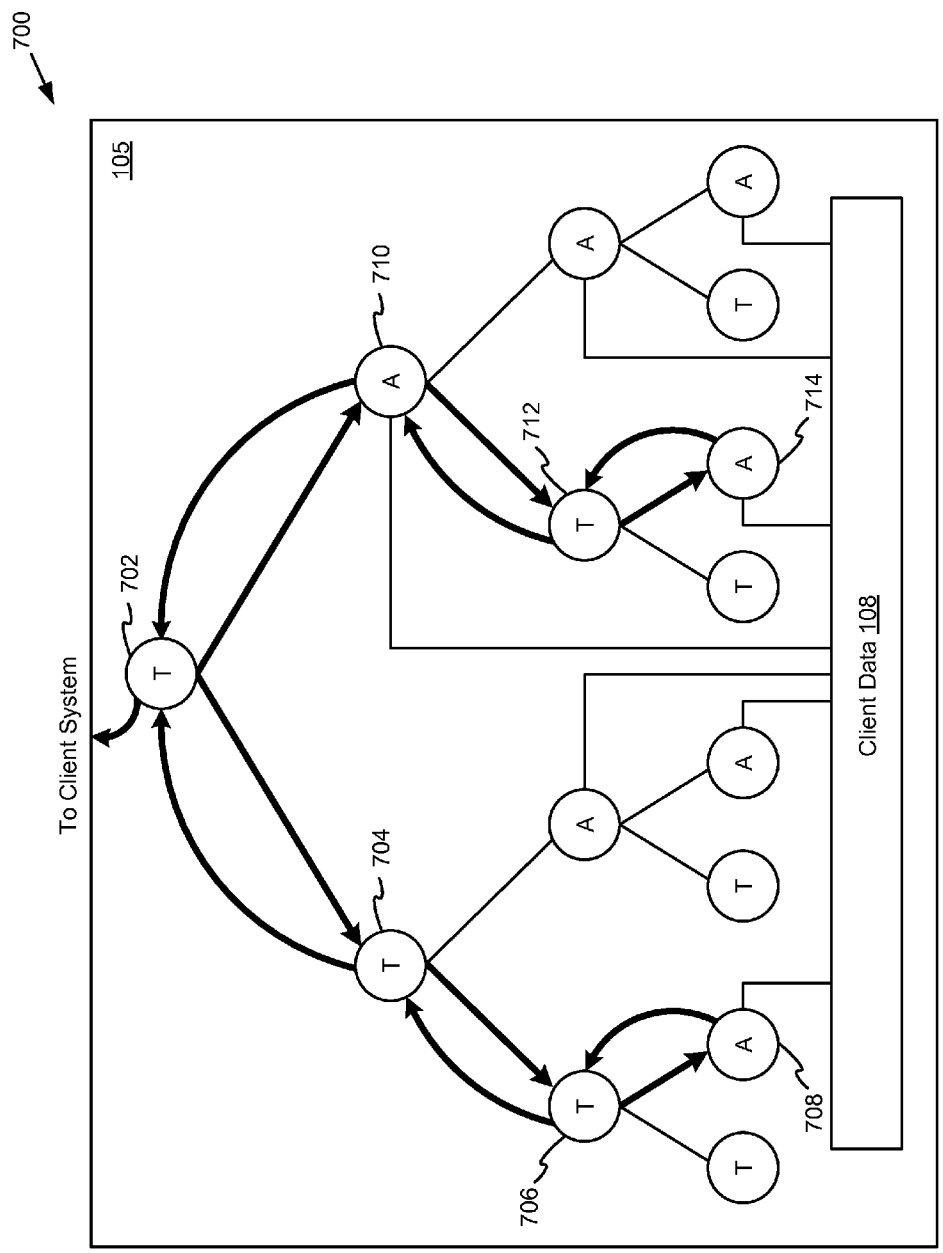
FIG. 7 is a diagram of an exemplary traversal of storage requests through storage transaction servers and storage access servers, in accordance with some embodiments.

FIG. 7 is a diagram of an exemplary traversal of storage requests through storage transaction servers and storage access servers, in accordance with some embodiments. Storage transaction servers are denoted "T", and storage access servers are denoted "A". As shown, and strictly as an example, a storage request is first processed by a first-level transaction node 702 that performs some transaction-related processing on the storage request, passing at least some portion of the transaction request to a second-level transaction node 704. In turn, the second-level transaction node 704 performs some transaction-related processing the received transaction (or portion thereof), passing at least some portion of the transaction request to third-level transaction node 706. In turn, the third-level transaction node 706 performs some transaction-related processing the received transaction (or portion thereof), passing at least some portion of the transaction request to fourth-level access node 708. The fourth-level access node 708 performs at least one storage access function 610, possibly accessing the client data.

In an alternative traversal, and strictly as example, a storage request is first processed by a first-level transaction node 702 that performs some transaction-related processing on the storage request, passing at least one access request to second-level access node 710. In turn, the second-level access node 710 performs some access-related processing the received access request (or portion thereof), passing at least some portion of a transaction request to third-level transaction node 712. In turn, the third-level transaction node 712 performs some transaction-related processing the received transaction (or portion thereof), passing at least some portion of the transaction request to fourth-level access node 714. As shown, fourth-level access node 714 performs at least one storage access function 610, possibly accessing the client data.

In an embodiment of the traversal tree 700, a storage access request is first received by a first-level storage transaction server node, and at least some storage access function is performed at a lower-level by a storage access function. The node at the lower-level returns a success or failure indication back up to the requesting instance of client system 110, possibly via a relay, traversing in the reverse of the path that was taken from the first-level node to the lower-level node.

The storage access server node at this lower-level may or may not run the same storage operating system as any other node. And, it may or may not provide the full capabilities of a file system, transactional management functions, or high-availability facilities including mirroring, striping, caching, etc.

Alternatively, the storage system 105 may be composed of a cluster of nodes (e.g., one or more storage transaction servers 120, one or more storage access servers 130) hosting VMs running the same storage operating system (e.g., ONTAP), and a particular node may host the same storage operating system running in a particular mode for performing a particular set of storage functions.

The first-level transaction node 702 of the storage system 105 is a transaction node that maintains state for received storage requests in order to provide transactional integrity. The first-level node (e.g., a first-level transaction node 702) of the storage system 105 coordinates the one or more lower-level requests and ensures that the high-level storage request either succeeds or fails.

In another embodiment of the traversal tree 700, a first-level storage transaction server node is implemented using an N-blade, and a lower-level storage access server is implemented by a D-blade. Thus, a storage access request is first received by a first-level N-blade, and at least some storage access function is performed at a lower-level by a D-blade. In another embodiment of the traversal tree 700, a first-level storage transaction server node is implemented using an N-blade, a second-level storage transaction server is implemented by a D-blade, and a third-level storage access server having physical disks accessible by the D-blade. Thus, a storage access request is first received by a first-level N-blade, routed to a particular second-level D-blade which may create one or more sub-requests, in turn routing to one or more third-level storage access servers.

Figure 8:
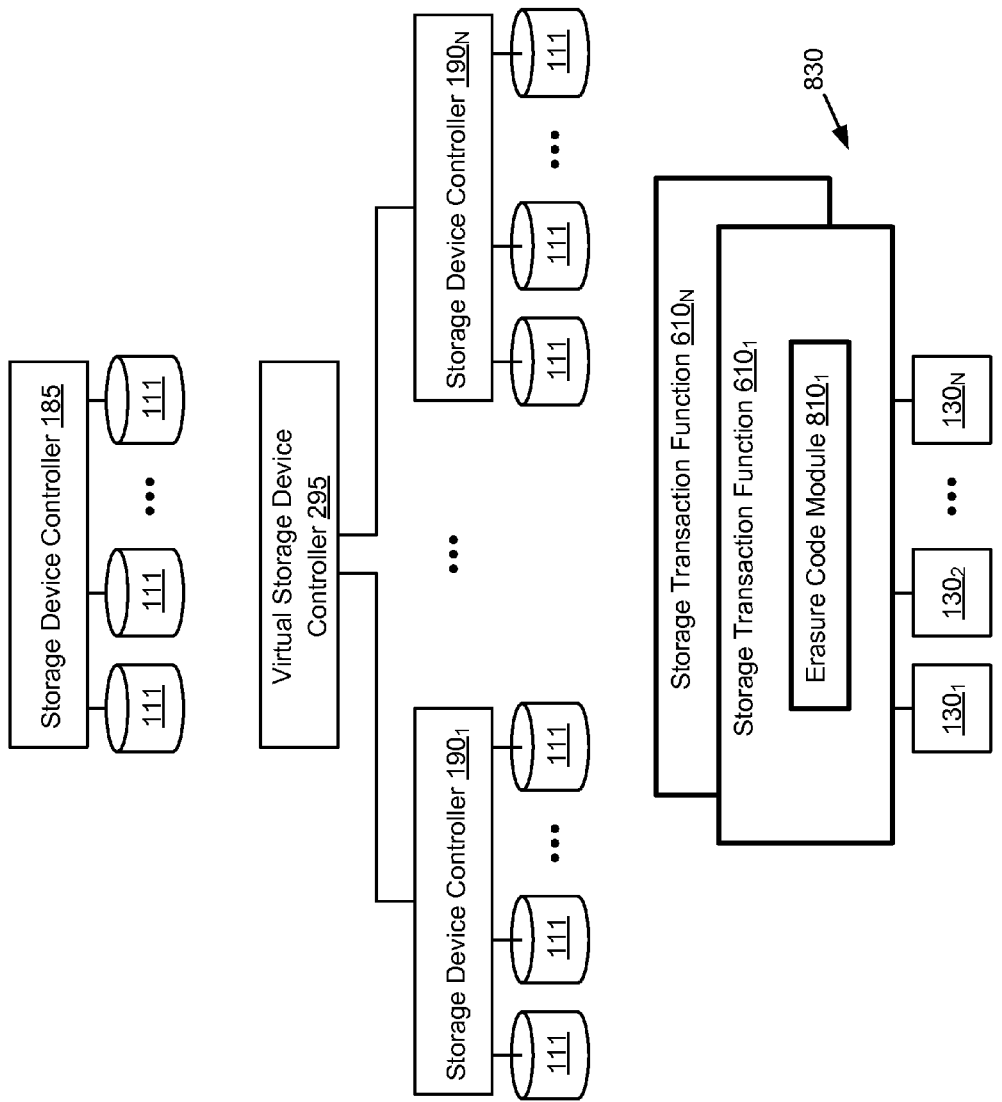
FIG. 8 is a diagram of embodiments of an apparatus using erasure codes, in accordance with some embodiments.

FIG. 8 is a diagram of embodiments of an apparatus using erasure codes, in accordance with some embodiments. As shown in FIG. 8, an implementation of one or more erasure code modules 810 for recovery of information within the storage access server failure domain after failure of a storage access server 130 is depicted. A storage device controller 190 might be used in recovering from a failure of a node from among a group comprising one or more storage devices 111.

In some embodiments, a storage access server 130 executing a storage access VM 180 executes a storage access operating system 290 having a virtual storage device controller 295 (shown in FIG. 2). Similarly, a virtual storage device controller 295 might be used in recovering from a failure of a node from among a group comprising one or more storage device controllers 190. Also, as shown, a storage transaction function 510 might be used in recovering from a failure of a node from among a group comprising one or more storage access servers 130.

In the case of failure (e.g., a drive-level failure) of a node from among a group comprising one or more storage devices 111 techniques such as RAID may be employed by a storage device controller for detecting a data error, determining the nature of the error, determining the source of the error, determining if the remaining storage device nodes in the group can be used to reconstruct the data and reconstructing the data to a condition absent the detected error.

In the case of failure of a node from among a group comprising one or more storage device controllers 190 (e.g., a drive-group failure) techniques may be employed by a virtual storage device controller 295 for detecting a storage device controller error, determining the nature of the error, determining the source of the error, determining if the remaining storage device controller nodes in the group can be used to reconstruct the data and reconstructing the data to a condition absent the detected error.

In the case of failure of a node from among a group comprising one or more storage access servers 130 (e.g., a storage access server failure) techniques may be employed by a storage transaction function 510 for detecting a storage access server error, determining the nature of the error, determining the source of the error, determining if the remaining storage access server nodes in the group can be used to reconstruct the data and reconstructing the data to a condition absent the detected error.

In the latter case of failure of a node from among a group comprising one or more storage access servers 130 (e.g., a storage access server failure). A storage access server failure may imply loss of function of several different hardware resources. For example, loss (failure) of a storage access server might mean loss of accessibility of any one or more hardware resources (e.g., power supplies and power management hardware, volatile memory, non-volatile memory, network interface facilities, computing resources such as processors and co-processors, physical storage devices, RAID hardware, environmental and enclosure management facilities, etc.). In the particular case of enclosure management facilities, any IPMI module (e.g., a storage transaction server IPMI module 520, a storage access server IPMI module 620) might report instrumented conditions using to a higher-level node.

In some embodiments, a storage access server 130 might include a storage access function 610 such that a storage access server 130 emulates a storage device 111. In such embodiments certain data errors can be detected almost instantaneously upon a failed storage access transaction, and a RAID recovery technique might be sufficient for detecting a data error, determining the nature of the error, determining the source of the error, determining if the remaining instances of storage access server nodes in the group can be used to reconstruct the data and reconstructing the data to a condition absent the detected error.

However, certain data errors may not be detectable almost instantaneously upon a failed storage access transaction. Accordingly, herein are disclosed detection and recovery techniques that extend the scope of recovery functions beyond that provided by RAID (e.g., RAID-4, RAID-5, RAID-DP) or RAID emulation. Error recovery schemes generally involve a trade-off between the extent of a define failure domain for which a recovery scheme is implemented, for example, the cost and complexity of managing the data integrity within the failure domain, the predicted frequency of a failure, and the cost and complexity of implementing a recovery.

In some embodiments, a technique to extend the scope of recovery functions beyond that provided by RAID is known as "wink-out-ride-through" or "Disk Offline" function. Included in the wink-out-ride-through technique are mechanisms for logging write requests for later replay of the logged write requests to any one or more failed nodes. Having such a record of writes for later replay may reduce the frequency of full RAID recovery in the distributed storage subsystem, since many detected failures may be software-related failures. In many cases of a software-related failure, recovery may be at least partially performed by a reboot of the failed virtual machine or a reboot of the failed hypervisor. In more extreme cases of a software-related failure, recovery may be at least partially performed by a reboot of the failed physical server. The wink-out-ride-through technique is facilitated by a transaction server, whereby a transaction server hosts a storage transaction function 510 capable of logging writes for later replay of writes to any one or more failed nodes.

In some embodiments a storage transaction function 510 employs the use of erasure codes with a high degree of redundancy in the application of the erasure code. For example, a storage access server redundancy group 830 might be rebuilt using one or more RAID techniques (e.g., RAID-4, RAID-5, or RAID-DP), and the number of members of the storage access server redundancy group 830 may be limited to a small number, thus reducing the load imposed by a RAID recovery in the event of the failure of a member of the storage access server redundancy group 830.

In some embodiments a storage transaction function 510 employs the use of one or more erasure codes with one or more specific characteristics inherent in the selected erasure code. For example, erasure code schemes known as "optimal codes" have the property that any k out of the n code word symbols are sufficient to recover the original data (i.e., they have optimal reception efficiency). Erasure codes used in storage systems may have quadratic encoding and decoding complexity. Certain techniques, may reduce encoding and decoding complexity to O(n log(n)) or better. Any one or more erasure code techniques and/or replication techniques might be implemented within a storage transaction function 510 (e.g., parity checks, Reed-Soloman codes, fountain codes, triplexing, etc.).

In some embodiments using a plurality of storage access servers 130 within a storage access server redundancy group 830, and a storage transaction server 120, a storage transaction server hosts a storage transaction function 510 for receiving a storage request and forming the storage request into a storage transaction request and a storage access request, and communicating at least a portion of the storage access request to at least two storage access servers, possibly using a erasure code for forming a storage access request. The storage transaction server hosts a storage transaction function 510 for monitoring the success or failure of the storage access request communicated to a first of the least two storage access servers, and for monitoring the success or failure of the storage access request communicated to a second of the least two storage access servers. Based on the monitored success or failure, the storage transaction server may provide transactional integrity by invoking a storage reconstruction operation involving at least one of the least two storage access servers.

For example, in a storage system involving data redundancy based on RAID-1 (i.e., one-to-one mirrored pair) two storage access servers may each be viewed as a RAID-1 group member, and would implement a mirrored configuration. In the event of a monitored failure of either one of the two storage access servers, the data belonging to the failed server can be reconstructed from the other storage access server of the pair. The data to be reconstructed can be re-written to the failed server (e.g., in the case of a transient error), or re-written to a third storage access server.

Figure 9:
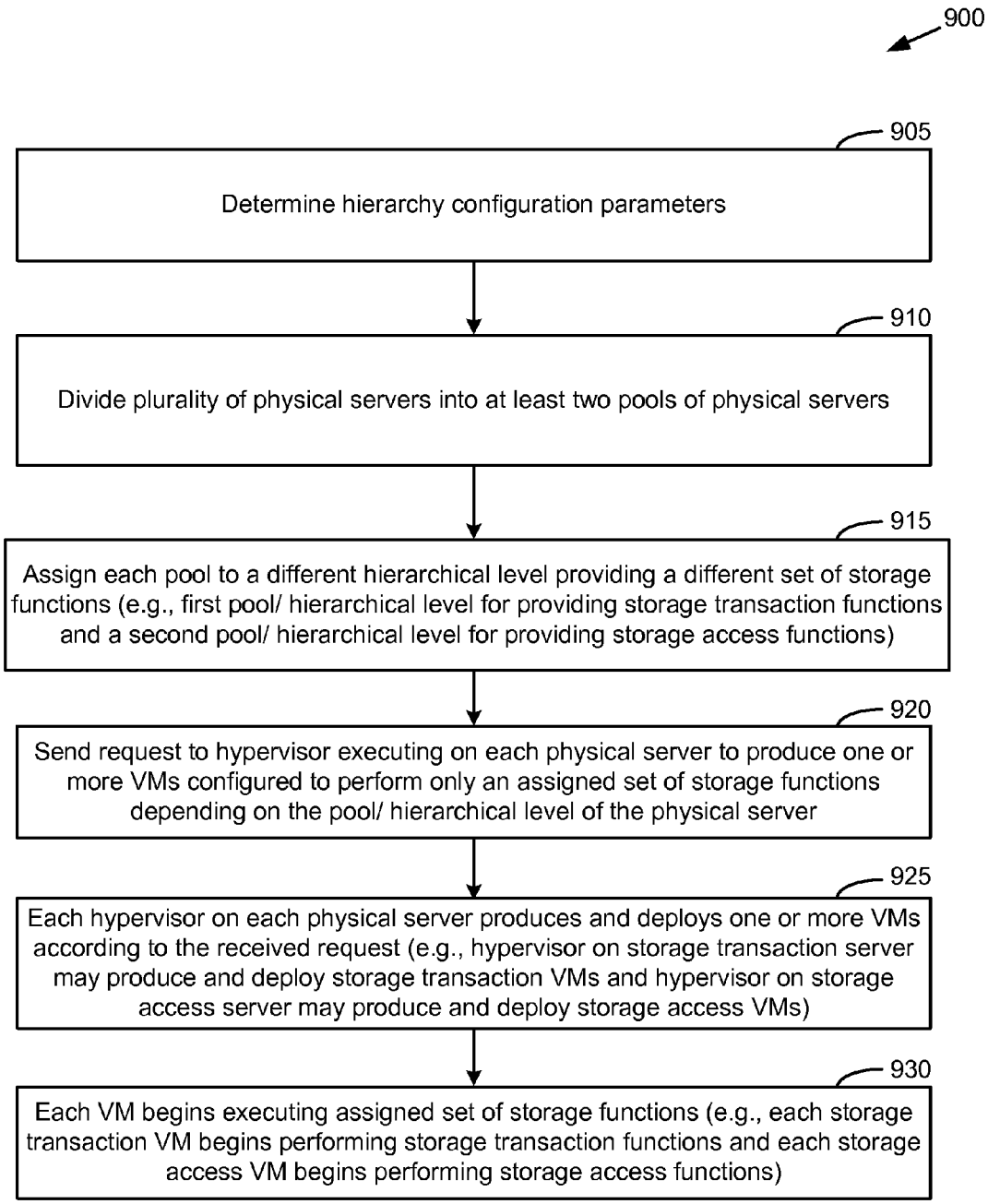
FIG. 9 is a flowchart of a method for producing a storage system configured to have hierarchical levels of physical servers and VMs based on storage functions.

III. Methods for Providing Hierarchical Levels and High-Availability of Storage Systems A. Method for Producing a Storage System with Hierarchical Levels of Storage Functions FIG. 9 is a flowchart of a method 900 for producing a storage system 105 configured to have hierarchical levels 109 of physical servers 102 and VMs 103 based on storage functions. In some embodiments, some of the steps of the method 900 are implemented by software and/or hardware. In some embodiments, some of the steps of method 900 are performed by a VM hierarchy module 50 residing and executing on at least one of the physical servers 102. The VM hierarchy module 50 may perform the method 900 in conjunction with a hypervisor and operating system executing on each physical server 102. For example, the VM hierarchy module 50 may perform the method 900 by sending commands/requests to the various components (e.g., hypervisor, operating system, etc.) of a plurality of physical servers 102. The order and number of steps of the method 900 are for illustrative purposes only and, in other embodiments, a different order and/or number of steps are used.

The method 900 begins by determining (at 905) a set of hierarchy configuration parameters, for example, a total number of physical servers 102 available to be used and the number of storage transaction servers 120, storage transaction VMs 170, storage access servers 130, and/or storage access VMs 180 to be produced. For example, the method 900 may receive the hierarchy parameters from an administrator through a user interface or command line interface of the VM hierarchy module 50. The total number of physical servers 102 available may comprise a plurality of physical servers 102.

The method 900 then divides (at 910) the plurality of physical servers 102 into at least two sub-sets (pools) of physical servers 102 for producing at least a first pool of physical servers 102 and a second pool of physical servers 102. Each pool may have one or more physical servers 102. The method 900 may do so according to the hierarchy configuration parameters. The method 900 assigns (at 915) each pool of physical servers 102 to a different hierarchical level, each hierarchical level for providing a different set of storage functions. Each set of storage functions assigned to a hierarchical level may comprise a sub-set of overall storage functions provided by a storage operating system. As such, each pool of physical servers 102 is assigned to perform a different set of storage functions depending on which hierarchical level the pool is assigned.

For example, the method may divide (at 910) the plurality of physical servers 102 into a first pool of storage transaction servers 120 and a second pool of storage access servers 130. The method then assigns (at 915) the first pool of storage transaction servers 120 to a first hierarchical level for providing storage transaction functions and the second pool of storage access servers 130 to a second hierarchical level for providing storage access functions.

Each physical server 102 of a pool may be configured to execute VMs 103 for providing storage functions of the hierarchical level that the pool and the physical server 102 is assigned. The method 900 may do so by sending (at 920) a request to each hypervisor 280 executing on each physical server to produce one or more VMs 103 each executing a storage operating system and zero or more storage applications. The method 900 may do so according to the hierarchy configuration parameters. The request may specify that each VM 103 on the physical server 102 is to be configured to perform only an assigned set of storage functions of the storage operating system that comprise the set of storage functions of the hierarchical level that the physical server 102 is assigned.

For example, the method 900 may send (at 920) a request to each hypervisor 280 executing on each storage transaction server 120 of the first pool/hierarchical level to produce one or more VMs 103 each performing only storage transaction functions of the storage operating system. The method 900 may also send (at 920) a request to each hypervisor 280 executing on each storage access server 130 of the second pool/hierarchical level to produce one or more VMs 103 each performing only storage access functions of the storage operating system.

Each hypervisor 280 on each physical server 102 then produces and deploys (at 925) the one or more VMs 103 according to the received request. A hypervisor 280 may produce a VM 103 according to the received request by configuring the VM 103 to execute a storage operating system and send a command line to the storage operating system to only perform a particular set of storage functions.

For example, each hypervisor 280 on each storage transaction server 120 may produce and deploy (at 925) one or more storage transaction VMs 170 each performing only storage transaction functions. Also, each hypervisor 280 on each storage access server 130 may produce and deploy (at 925) one or more storage access VMs 180 each performing only storage access functions.

The VM 103 may comprise an executable module that may be sent to other physical servers 102 over the network 135. In some embodiments, a hypervisor 280 on a first physical server 102 may produce a VM 103 and send the VM 103 on a second physical server 102 in the same pool/hierarchical level. The hypervisor 280 on the second physical server 102 may receive and deploy the VM 103 on the second physical server 102. In these embodiments, one physical server 102 in a pool/hierarchical level may produce the VMs for the pool/hierarchical level and distribute the VMs to the other physical servers 102 in the pool/hierarchical level.

For example, a hypervisor 280 on a particular storage transaction server 120 in the first pool/hierarchical level may produce multiple storage transaction VMs 170 and send the storage transaction VMs 170 to the hypervisors 280 of the other storage transaction servers 120 in the first pool/hierarchical level, which in turn deploy the received storage transaction VMs 170 on the storage transaction server 120. Similarly, a hypervisor 280 on a particular storage access server 130 in the second pool/hierarchical level may produce multiple storage access VMs 180 and send the storage access VMs 180 to the hypervisors 280 of the other storage access servers 130 in the second pool/hierarchical level, which in turn deploy the received storage access VMs 180 on the storage access server 130.

Each VM 103 then begins executing (at 930) its assigned set of storage functions for providing data services to clients. For example, each storage transaction VM 170 may begin performing storage transaction functions and each storage access VM 180 may begin performing storage access functions. The method then ends.

As described above, the method 900 divides the plurality of servers into at least two pools of servers, assigns each pool of servers to provide a different set of storage functions, and for each pool of servers, providing one or more virtual machines (VMs) executing on one or more servers in the pool, each VM executing a storage operating system and configured for performing only the assigned set of storage functions, wherein the assigned set of storage functions comprises a sub-set of storage functions provided by the storage operating system. As such, the method 900 produces a first set of one or more VMs 103 (the storage transaction VMs 170) for performing a first set of storage functions (the storage transaction functions) and a second set of one or more VMs 103 (the storage access VMs 180) for performing a second set of storage functions (the storage access functions), the first and second sets of storage functions each comprising a sub-set of storage functions provided by the storage operating system.

B. Method for Providing High-Availability Storage Systems in a Hierarchical Virtual Server Environment.

Figure 10:
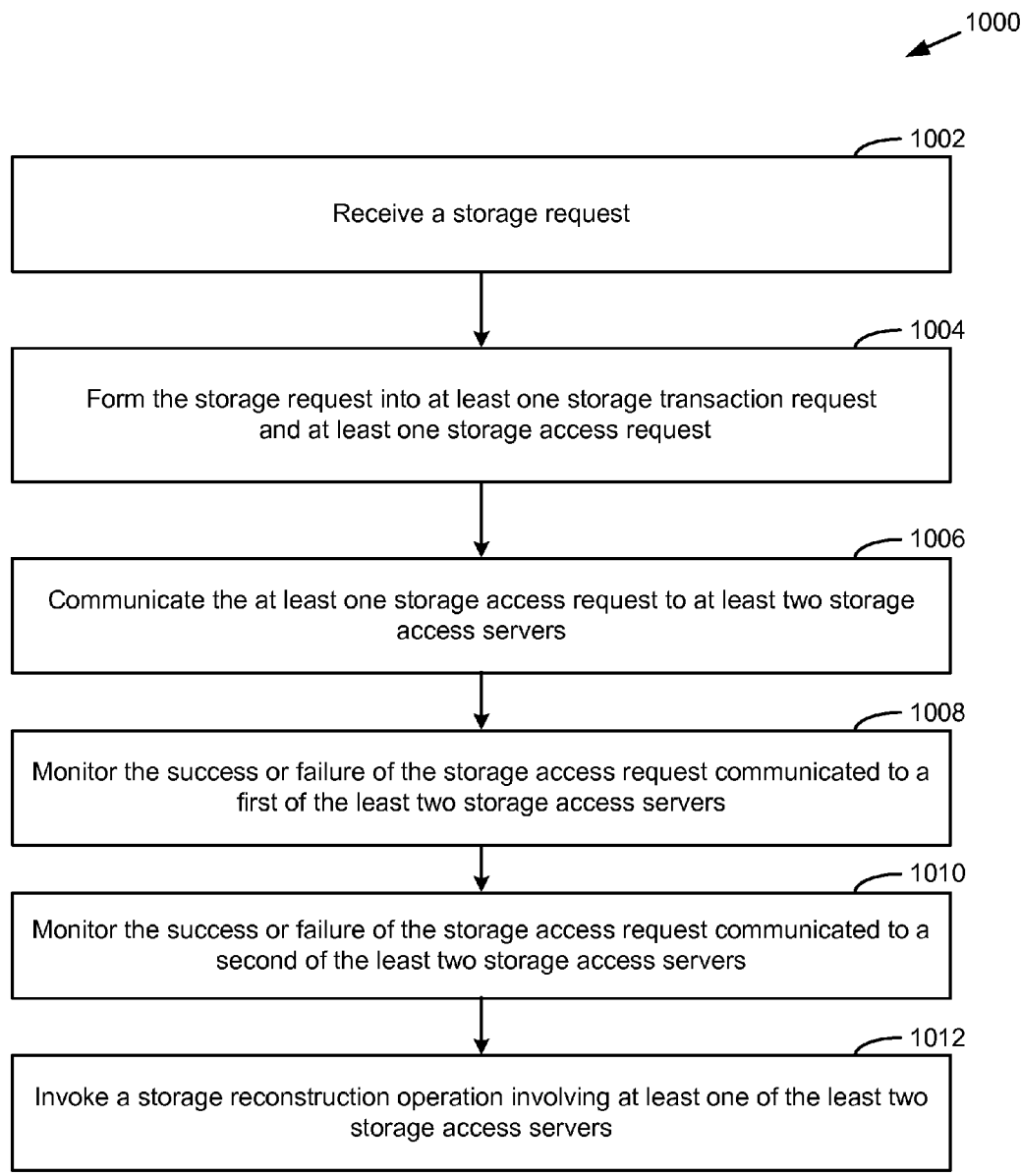
FIG. 10 is a flowchart of a method for providing high-availability of a storage system in a hierarchical virtual server environment.

FIG. 10 shows a flowchart of operations for high-availability of storage systems in a hierarchical virtual server environment, in accordance with some embodiments. As described above, a system for detecting and reconstructing data across a plurality of storage access servers may include a storage system 105 comprised of one or more storage transaction servers 120 connected to storage access servers 130 via an inter-server network 135. The storage system 105 may be configured for carrying out one or more methods for detecting and reconstructing data across a plurality of storage access servers. In some embodiments, some of the steps of the method 1000 are performed within the memory space of a physical server 102. The order and number of steps of the method 1000 are for illustrative purposes only and, in other embodiments, a different order and/or number of steps are used.

The method 1000 receives (at 1002) a storage request and forms (at 1004) the storage request into at least one storage transaction request and at least one storage access request, then communicates (at 1006) at least a portion of the at least one storage access request to at least two storage access servers. In some cases a storage access request is communicated in substantially the same form to two or more storage access servers. A method step (at 1008) serves for monitoring the success or failure of the at least one storage access request communicated to a first of the least two storage access servers. A method step (at 1010) serves for monitoring the success or failure of the at least one storage access request communicated to a second of the least two storage access servers. The monitoring operations (at 1008 and at 1010) may detect success or failure of an operation and may invoke (at 1012) a storage reconstruction operation involving at least one of the least two storage access servers.

In some embodiments of method 1000, the forming (at 1004) of the storage request into at least one storage transaction request includes processing based on the transaction type, and in some cases forming the storage request includes forming the storage request into a transaction request that is satisfied by two or more responses. Alternatively, forming (at 1004) the storage request may include forming the storage request into an atomic transaction comprising two or more transactions, all of which transactions must be deemed successful in order for the atomic transaction to be deemed completed. In some embodiments, forming (at 1004) includes selecting a second storage access server based on a storage access server redundancy group. In other embodiments, forming the storage request includes forming pairs comprising (a) a storage access request sub-request and (b) a corresponding monitoring sub-request for monitoring its paired storage access request sub-request. A monitoring operation may include logging write requests and a storage reconstruction may include replay of the logged write requests to any one or more failed storage access servers.

In some embodiments, invoking a storage reconstruction operation (at 1012) allocates a replacement storage access server virtual machine on a physical server. Selection of a storage reconstruction operation may include processing based on a result of a monitoring operation.

C. Various Embodiments

Some embodiments may be conveniently implemented using a conventional general purpose or a specialized digital computer or microprocessor programmed according to the teachings herein, as will be apparent to those skilled in the computer art. Some embodiments may be implemented by a general purpose computer programmed to perform method or process steps described herein. Such programming may produce a new machine or special purpose computer for performing particular method or process steps and functions (described herein) pursuant to instructions from program software. Appropriate software coding may be prepared by programmers based on the teachings herein, as will be apparent to those skilled in the software art. Some embodiments may also be implemented by the preparation of application-specific integrated circuits or by interconnecting an appropriate network of conventional component circuits, as will be readily apparent to those skilled in the art. Those of skill in the art would understand that information may be represented using any of a variety of different technologies and techniques.

Some embodiments include a computer program product comprising a computer readable medium (media) having instructions stored thereon/in and, when executed (e.g., by a processor), perform methods, techniques, or embodiments described herein, the computer readable medium comprising sets of instructions for performing various steps of the methods, techniques, or embodiments described herein. The computer readable medium may comprise a storage medium having instructions stored thereon/in which may be used to control, or cause, a computer to perform any of the processes of an embodiment. The storage medium may include, without limitation, any type of disk including floppy disks, mini disks (MDs), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any other type of media or device suitable for storing instructions and/or data thereon/in.

Stored on any one of the computer readable medium (media), some embodiments include software instructions for controlling both the hardware of the general purpose or specialized computer or microprocessor, and for enabling the computer or microprocessor to interact with a human user and/or other mechanism using the results of an embodiment. Such software may include without limitation device drivers, operating systems, and user applications. Ultimately, such computer readable media further includes software instructions for performing embodiments described herein. Included in the programming (software) of the general-purpose/specialized computer or microprocessor are software modules for implementing some embodiments.

Those of skill would further appreciate that the various illustrative logical blocks, modules, circuits, techniques, or method steps of embodiments described herein may be implemented as electronic hardware, computer software, or combinations of both. To illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the embodiments described herein.

The various illustrative logical blocks, modules, and circuits described in connection with the embodiments disclosed herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The algorithm, techniques, processes, or methods described in connection with embodiments disclosed herein may be embodied directly in hardware, in software executed by a processor, or in a combination of the two. In some embodiments, any software operating system, VM, application, program, tool, module, or layer described herein may comprise an engine comprising hardware and/or software configured to perform embodiments described herein. In general, functions of a software application, program, tool, module, or layer described herein may be embodied directly in hardware, or embodied as software executed by a processor, or embodied as a combination of the two. A software application, layer, or module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

While the embodiments described herein have been described with reference to numerous specific details, one of ordinary skill in the art will recognize that the embodiments can be embodied in other specific forms without departing from the spirit of the embodiments. Thus, one of ordinary skill in the art would understand that the embodiments described herein are not to be limited by the foregoing illustrative details, but rather are to be defined by the appended claims.

The invention claimed is:

1. A method for providing high-availability of client data comprising:
    configuring a plurality of storage access servers as a redundant array of storage access servers (RASAS), each storage access server comprising:
        a set of one or more storage devices for storing client data;
        one or more storage access virtual machines (VMs), each storage access VM executing a separate storage operating system providing an overall set of storage functions, each storage access VM configured for performing only an assigned sub-set of storage functions of the overall set of storage functions and is not configured for performing all storage functions of the overall set of storage functions provided by the storage operating system, the assigned sub-set of storage functions of each storage access VM comprising storage access functions for receiving storage access sub-requests from a storage transaction server and executing the storage access sub-requests on the set of storage devices; and
    configuring at least one storage transaction server for:
        receiving an access request from a client system;
        producing at least two storage access sub-requests from the received access request, the at least two storage access sub-requests being based on the RASAS configuration of the plurality of storage access servers;
        communicating each storage access sub-request to a storage access server for execution.

2. The method of claim 1, wherein:
    the at least one storage transaction server is further configured for monitoring the success or failure of the at least two storage access sub-requests.

3. The method of claim 1, wherein:
    the at least one storage transaction server is further configured for invoking a storage reconstruction operation involving at least one of the at least two storage access servers.

4. The method of claim 3, wherein:
    invoking a storage reconstruction operation allocates a replacement storage access VM on a physical server.

5. The method of claim 4, further comprising:
    replay of logged write requests to the replacement storage access VM on a physical server.

6. The method of claim 1, wherein:
    the plurality of storage access servers is configured as a RASAS using a mirroring configuration;
    the received access request comprises a write request comprising client data to be stored; and
    the at least two storage access sub-requests comprises a first storage access sub-request communicated to a first storage access server and a second storage access sub-request communicated to a second storage access server, each storage access sub-request specifying storage of all the received client data, the first storage access server storing all the received client data to its set of storage devices and the second storage access server storing all the received client data to its set of storage devices.

7. The method of claim 1, wherein:
    the plurality of storage access servers is configured as a RASAS using a striping configuration;
    the received access request comprises a write request comprising client data to be stored; and
    the at least two storage access sub-requests comprises a first storage access sub-request communicated to a first storage access server and a second storage access sub-request communicated to a second storage access server, the first storage access sub-request specifying storage of a first sub-set of the client data and the second storage access sub-request specifying storage of a second sub-set of the client data, the first storage access server storing the first sub-set of the client data to its set of storage devices and the second storage access server storing the second sub-set of the client data to its set of storage devices.

8. A non-transitory computer readable medium having instructions stored thereon when executed by a processor, provide high-availability of client data, the computer readable medium comprising instructions for:
    configuring a plurality of storage access servers as a redundant array of storage access servers (RASAS), each storage access server comprising:
        a set of one or more storage devices for storing client data;
        one or more storage access virtual machines (VMs), each storage access VM executing a separate storage operating system providing an overall set of storage functions, each storage access VM configured for performing only an assigned sub-set of storage functions of the overall set of storage functions and is not configured for performing all storage functions of the overall set of storage functions provided by the storage operating system, the assigned sub-set of storage functions of each storage access VM comprising storage access functions for receiving storage access sub-requests from a storage transaction server and executing the storage access sub-requests on the set of storage devices; and
    configuring at least one storage transaction server for:
        receiving an access request from a client system;
        producing at least two storage access sub-requests from the received access request, the at least one storage access sub-requests being based on the RASAS configuration of the plurality of storage access servers;
        communicating each storage access sub-request to a storage access server for execution.

9. The non-transitory computer readable medium of claim 8, wherein:
the at least one storage transaction server is further configured for monitoring the success or failure of the at least one storage access sub-requests.

10. The non-transitory computer readable medium of claim 8, wherein:
the at least one storage transaction server is further configured for invoking a storage reconstruction operation involving at least one of the at least two storage access servers.

11. The non-transitory computer readable medium of claim 10, wherein:
invoking a storage reconstruction operation allocates a replacement storage access VM on a physical server.

12. The non-transitory computer readable medium of claim 11, further comprising instructions for:
replay of logged write requests to the replacement storage access VM on a physical server.

13. The non-transitory computer readable medium of claim 8, wherein:
the plurality of storage access servers is configured as a RASAS using a mirroring configuration;
the received access request comprises a write request comprising client data to be stored; and
the at least two storage access sub-requests comprises a first storage access sub-request communicated to a first storage access server and a second storage access sub-request communicated to a second storage access server, each storage access sub-request specifying storage of all the received client data, the first storage access server storing all the received client data to its set of storage devices and the second storage access server storing all the received client data to its set of storage devices.

14. The non-transitory computer readable medium of claim 8, wherein:
the plurality of storage access servers is configured as a RASAS using a striping configuration;
the received access request comprises a write request comprising client data to be stored; and
the at least two storage access sub-requests comprises a first storage access sub-request communicated to a first storage access server and a second storage access sub-request communicated to a second storage access server, the first storage access sub-request specifying storage of a first sub-set of the client data and the second storage access sub-request specifying storage of a second sub-set of the client data, the first storage access server storing the first sub-set of the client data to its set of storage devices and the second storage access server storing the second sub-set of the client data to its set of storage devices.

15. A system comprising:
a plurality of storage access servers configured as a redundant array of storage access servers (RASAS), each storage access server comprising:
a set of one or more storage devices for storing client data;
a memory for storing application instructions;
a processor for executing the application instructions;
one or more storage access virtual machines (VMs), each storage access VM executing a separate storage operating system providing an overall set of storage functions, each storage access VM configured for performing only an assigned sub-set of storage functions of the overall set of storage functions and is not configured for performing all storage functions of the overall set of storage functions provided by the storage operating system, the assigned sub-set of storage functions of each storage access VM comprising storage access functions for receiving storage access sub-requests from a storage transaction server and executing the storage access sub-requests on the set of storage devices; and
at least one storage transaction server configured for:
receiving an access request from a client system;
producing at least two storage access sub-requests from the received access request, the at least two storage access sub-requests being based on the RASAS configuration of the plurality of storage access servers;
communicating each storage access sub-request to a storage access server for execution.

16. The system of claim 15, wherein:
the at least one storage transaction server is further configured for monitoring the success or failure of the at least two storage access sub-requests.

17. The system of claim 15, wherein:
the at least one storage transaction server is further configured for invoking a storage reconstruction operation involving at least one of the at least two storage access servers.

18. The system of claim 17, wherein:
invoking a storage reconstruction operation allocates a replacement storage access VM on a physical server.

19. The system of claim 18, wherein:
logged write requests are replayed to the replacement storage access VM on a physical server.

20. The system of claim 15, wherein:
the plurality of storage access servers is configured as a RASAS using a mirroring configuration;
the received access request comprises a write request comprising client data to be stored; and
the at least two storage access sub-requests comprises a first storage access sub-request communicated to a first storage access server and a second storage access sub-request communicated to a second storage access server, each storage access sub-request specifying storage of all the received client data, the first storage access server storing all the received client data to its set of storage devices and the second storage access server storing all the received client data to its set of storage devices.

21. The system of claim 15, wherein:
the plurality of storage access servers is configured as a RASAS using a striping configuration;
the received access request comprises a write request comprising client data to be stored; and
the at least two storage access sub-requests comprises a first storage access sub-request communicated to a first storage access server and a second storage access sub-request communicated to a second storage access server, the first storage access sub-request specifying storage of a first sub-set of the client data and the second storage access sub-request specifying storage of a second sub-set of the client data, the first storage access server storing the first sub-set of the client data to its set of storage devices and the second storage access server storing the second sub-set of the client data to its set of storage devices.

* * * * *